United States Patent
Hirahara

(10) Patent No.: US 9,058,236 B2
(45) Date of Patent: Jun. 16, 2015

(54) MONITORING APPARATUS, MANAGEMENT SYSTEM, FIRMWARE UPDATING METHOD, AND PROGRAM THEREOF

(71) Applicant: CANON KABUSHIKI KAISHA, Tokyo (JP)

(72) Inventor: Akiko Hirahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/017,115

(22) Filed: Sep. 3, 2013

(65) Prior Publication Data
US 2014/0068597 A1 Mar. 6, 2014

(30) Foreign Application Priority Data
Sep. 6, 2012 (JP) ................................ 2012-196247

(51) Int. Cl.
*G06F 9/44* (2006.01)
*G06F 9/445* (2006.01)

(52) U.S. Cl.
CPC . *G06F 8/65* (2013.01); *G06F 8/665* (2013.01)

(58) Field of Classification Search
USPC .................................. 717/168–176; 709/203
IPC ......................................... G06F 8/60,8/61, 8/65
See application file for complete search history.

(56) References Cited

U.S. PATENT DOCUMENTS

| | | | |
|---|---|---|---|
| 7,480,907 B1 * | 1/2009 | Marolia et al. ................ | 717/174 |
| 7,506,335 B1 * | 3/2009 | Wooff et al. ................... | 717/173 |
| 7,516,450 B2 * | 4/2009 | Ogura ........................... | 717/168 |
| 7,640,367 B2 * | 12/2009 | Takamoto et al. .............. | 710/6 |
| 7,882,502 B2 * | 2/2011 | Kovachka-Dimitrova et al. ............................. | 717/169 |
| 8,024,723 B2 * | 9/2011 | Nahm et al. ................... | 717/172 |
| 8,065,362 B2 * | 11/2011 | Greven et al. ................. | 709/203 |
| 8,112,508 B1 * | 2/2012 | Ambrose et al. .............. | 709/223 |
| 8,196,133 B2 * | 6/2012 | Kakumani et al. ............ | 717/172 |
| 8,250,564 B2 * | 8/2012 | Bando et al. .................. | 717/171 |
| 8,261,256 B1 * | 9/2012 | Adler et al. ................... | 717/173 |
| 8,266,613 B2 * | 9/2012 | Bando et al. .................. | 717/173 |
| 8,375,381 B1 * | 2/2013 | Clark et al. ................... | 717/170 |
| 8,392,904 B2 * | 3/2013 | Garcia et al. .................. | 717/168 |
| 8,745,609 B2 * | 6/2014 | Oka ............................... | 717/168 |
| 8,804,168 B2 * | 8/2014 | Nishikawa .................... | 358/1.15 |
| 8,875,116 B2 * | 10/2014 | O'Neill et al. ................ | 717/168 |

FOREIGN PATENT DOCUMENTS

JP 2006-255955 A 9/2006
JP 2012-059180 A 3/2012

OTHER PUBLICATIONS

Kim et al, "Remote Progressive Firmware Update for Flash-Based Networked Embedded Systems" ACM, pp. 407-412, 2007.*
Li et al,"VIPER: Verifying the Integrity of PERipherals' Firmware" ACM, pp. 3-16, 2011.*
Gracioli et al, "An Operating System Infrastructure for Remote Code Update in Deeply Embedded Systems", ACM, pp. 1-5, 2008.*
Jurković et al, "Remote Firmware Update for Constrained Embedded Systems", IEEE, pp. 1019-1023, 2014.*

* cited by examiner

Primary Examiner — Anil Khatri
(74) Attorney, Agent, or Firm — Canon USA, Inc., I.P. Division

(57) ABSTRACT

An apparatus, control method, and system for updating firmware of an image forming apparatus remotely such that the image forming apparatus is monitored to determine the state of the image forming apparatus at the time the update instruction is received and to monitor whether the firmware in the image forming apparatus has been updated successfully.

11 Claims, 14 Drawing Sheets

MONITORING APPARATUS, MANAGEMENT SYSTEM, FIRMWARE UPDATING METHOD, AND PROGRAM THEREOF

BACKGROUND

1. Field of the Disclosure

Aspects of the present invention generally relate to a control technique for updating the firmware of an image forming apparatus by remote control.

2. Description of the Related Art

A device management system is conventionally provided for remotely monitoring the operational status of an image forming apparatus, such as a printer and a multifunction peripheral. In recent years, under such an environment of the device management system, the firmware of an image forming apparatus can be updated by remote control.

According to Japanese Patent Application Laid-Open No. 2012-59180, a monitoring center host (central management apparatus) receives a firmware download instruction including an update time setting from a service engineer of a vendor, and then the image forming apparatus acquires the instruction from the monitoring center host. Upon reception of the instruction, the image forming apparatus makes an inquiry to a distribution server about whether the firmware can be managed at the time when transmission load is property distributed. When the distribution server manages the firmware, the image forming apparatus downloads and stores the firmware in a hard disk drive (HDD), and performs update processing at a specified execution time.

Updating the firmware is a sensitive work, and thus it should not be performed, or cannot be performed in some states of the device. To solve such an issue, Japanese Patent Application Laid-Open No. 2006-255955 discusses an image forming apparatus (a printing apparatus) that checks its own operation state and then starts update processing according to a result of the check to rise a success ratio of updating the firmware.

However, as described in Japanese Patent Application Laid-Open No. 2012-59180, in a case where the image forming apparatus makes the inquiry of the firmware download instruction to the central management device, or performs the firmware update processing at an instruction time specified by a client, updating of the firmware may not be able to be performed in some states of the image forming apparatus. For example, when the image forming apparatus is in a power-off state, or when it is in printing operation or in trouble, the firmware update processing can cause problems. Further, when the image forming apparatus itself cannot notify a monitoring apparatus of an error state, for example, the power-off state, even a cause of failure of the update processing cannot be specified.

According to Japanese Patent Application Laid-Open No. 2006-255955, since the image forming apparatus itself controls start of the update processing based on its own operation state, it does not often fail in the update processing due to a problematic state. However, when the image forming apparatus is in the power-off state, obviously, it cannot deal with the update processing.

SUMMARY

According to an aspect of the present invention, a monitoring apparatus for monitoring a plurality of image forming apparatuses includes a memory and a processor in communication with the memory, the processor configured to control an inquiry unit that makes an inquiry to a management apparatus, a reception unit that receives, as a response to the inquiry, an update instruction for updating firmware for an image forming apparatus to be monitored, a transmission unit that transmits to the image forming apparatus to be monitored an instruction for performing communication with a distribution server to download the firmware based on the update instruction, a monitoring unit that monitors a state of the image forming apparatus corresponding to the update instruction, and a notification unit that notifies the management apparatus of a result of monitoring performed by the monitoring unit, wherein the monitoring unit monitors whether the firmware has been updated in the image forming apparatus corresponding to the update instruction.

Further features of the present disclosure will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Figure 1:
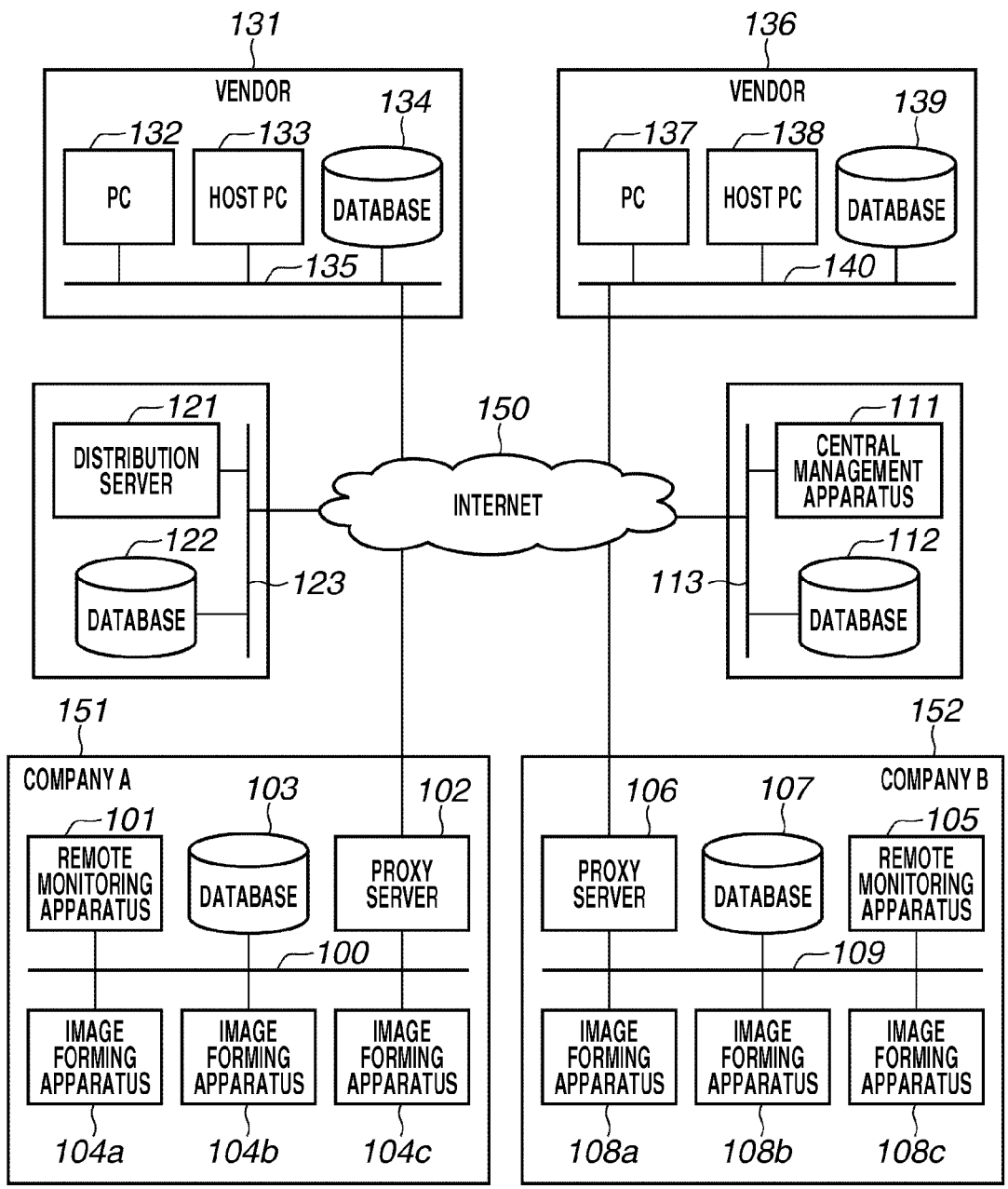
FIG. 1 is a block diagram illustrating a schematic configuration of an entire device management system according to an exemplary embodiment.

FIG. 1 is a block diagram illustrating a schematic configuration of an entire device management system according to an exemplary embodiment.

As illustrated in FIG. 1, systems of a plurality of vendors including systems 131 and 136 are connected to the device management system according to the present exemplary embodiment. The vendors' systems 131 and 136 include databases 134 and 139 for storing information about each related areas, sales information about clients, and management systems.

Further, the vendors' systems 131 and 136 include PCs 132 and 137 for controlling data registration to the databases 134 and 139 and correction thereof. The vendors use the PCs 132 and 137 to access a website provided by a central management apparatus 111 to brows the data.

Host PCs 133 and 138 include an operation unit and a display unit to play a role as the PCs 132 and 137. The PC 132, the host PC 133, and the database 134 are connected with one another via a local area network (LAN) 135. Further, the PC 137, the host PC 138, and the database 139 are connected with one another via a LAN 140.

FIG. 1 illustrates each system at a vendor side including a plurality of devices and realizing each function described below. For example, the databases 134 and 139 may be physically included in the host PCs 133 and 138, respectively. Further, if the databases 134 and 139 can be accessed from the host PCs 133 and 138, they may be located at another place via the Internet 150. In other words, the system at the vendor side may include the plurality of devices, or may include only one device.

In the system described above, between the vendor side and a client side, the central management apparatus 111 is provided. A database 112 serves as a history storage unit for storing information for monitoring, a counter of the image forming apparatus collected from the client side, trouble history information, and trouble pattern table.

The central management apparatus 111 and the database 112 are connected with each other via a LAN 113, which can be further connected to the Internet 150. The database 112 may be physically provided in the central management apparatus 111. Further, if the database 112 can be accessed from the central management apparatus 111, it may be located at another place via the Internet 150.

The central management apparatus 111 has functions of collecting, storing, and processing information about the image forming apparatus to be monitored and information indicating an operational status (including trouble information) from the remote monitoring apparatuses 101 and 105 described below, and then giving warnings to an outside. The central management apparatus 111 further has a function of distributing the above-described information to, for example, the host PCs 133 and 138 of the vendors.

The operational status refers to, for example, out of tonner, door opening, drum replacement, no cartridge, cooling fan trouble, substrate trouble, contamination of document positioning plate glass, out of staple, lack of amount of feeding paper sensor light. The operational status also refers to font memory overflow, rendering error, fixing device trouble, counter trouble, both-sided unit trouble, and paper jam. Counter information includes a charge counter to be charged by the vendor, a department counter tallied by each department of the client, counter for each size tallied for each sheet size, and a component counter indicating a consumption level of a component in the image forming apparatus.

The host PCs 133 and 138 of the vendors can register setting of the information and monitoring about the image forming apparatus to be monitored by the central management apparatus 111 to the central management apparatus 111. The central management apparatus 111 can merge the setting of the information and monitoring about the image forming apparatus to be monitored and registered from the host PC of each vendor to collectively manage them. Each of the host PCs 133 and 138 of the vendors can also perform the setting of the monitor on the remote monitoring apparatuses 101 and 105.

The service by the above-described device management system is provided based on contract between the vendor and the client. Thus, only the image forming apparatus determined to be monitored by the vendor based on the contract is to be monitored by the present management system.

The central management apparatus 111 provides the PCs 132 and 137 connected via the Internet 150 with a web page where the information stored in the database 112 and processed information can be browsed. This web page provides the browsing content limited for each authority of the vendors, clients, and users by user authentication. Further, a part of data can be changed via the web page.

According to the present system, at an intermediate position between the vendor side and the client side, a distribution server 121 is provided. The database 122 serves as a history storage unit for storing firmware, an application, and software license information to be applied for image forming apparatuses. The distribution server 121 distributes programs such as the firmware stored in the database to the image forming apparatus, and manages the program to apply them.

The distribution server 121 and the database 122 are connected with each other via a LAN 123, which can be connected to the Internet 150. The database 122 may be physically provided in the distribution server 121. Further, if the database 122 can be accessed from the distribution server 121, it may be located at another place via the Internet 150. The LAN 123 may be the same as the LAN 113, and the database 122 and the database 112 may share the data.

FIG. 1 illustrates only one central management apparatus 111, one database 112, one distribution server 133, and one database 134. However, actually, to collect the information from many image forming apparatuses and remote monitoring apparatuses and distribute load of firmware distribution, a plurality of central management apparatuses and databases may perform the distributed processing.

The system configuration at the client side will be described below.

A plurality of different environments is provided as an environment at the client side. FIG. 1 illustrates client systems 151 and 152.

In the client system 151 (company A), the image forming apparatuses 104a, 104b, and 104c connected to a LAN 100 connected to the Internet 150 are monitored by the remote monitoring apparatus 101. The remote monitoring apparatus 101 is always in an activated state, and communicates with the central management apparatus 111 and the distribution server 121 via the proxy server 102 and the Internet 150. Further, the image forming apparatuses 104a, 104b, 104c also communicate with the distribution server 121 via the proxy server 102 and the Internet 150.

For each communication among the remote monitoring apparatus 101, the central management apparatus 111, the distribution server 121, and the image forming apparatuses 104a, 104b, and 104c described above, a Hyper Text Transfer Protocol/Simple Object Access Protocol (HTTP/SOAP) can be used. The SOAP is a protocol for invoking from a computer the data or services of another computer based on Extensible Markup Language (XML). According to the present example, the SOAP is mounted on the HTTP. The communication via the SOAP exchanges SOAP messages with additional information attached to an XML document. Therefore, the computer supporting the SOAP includes an SOAP message generation unit for generating the SOAP message and an SOAP message interpretation unit for interpreting the SOAP message. According to the present exemplary embodiment, state information about the image forming apparatus is transmitted to the central management apparatus 111 by the SOAP message.

The remote monitoring apparatus 101 stores in the database 103 the information collected from the image forming apparatuses 104a, 104b, and 104c and a processing result of the collected data. The remote monitoring apparatus 101 also stores in the database 103 the setting of monitoring the image forming apparatus. The database 103 is connected to the LAN 100, but, may be independently provided inside the remote monitoring apparatus 101. Further, if the database 103 can be accessed from the remote monitoring apparatus 101, it can be located at another place via the Internet 150.

The remote monitoring apparatus 101 stores in the database 103 the state information about the image forming apparatus (e.g., occurrence of the trouble) every time when receiving the state information from the image forming apparatuses 104a, 104b, and 104c, and transmits it to the central management apparatus 111.

In the client system 152 (company B), information apparatuses 108a, 108b, and 108c connected to a LAN 109 connected to the Internet 150 is monitored by the remote monitoring apparatus 105. The remote monitoring apparatus 105 communicates with the central management apparatus 111 and the distribution server 121 via the proxy server 106 and the Internet 150. Further, the image forming apparatuses 108a, 108b, and 108c also communicate with the distribution server 121 via the proxy server 106 and the Internet 150. Since the client system 152 (company B) has a similar configuration as that of the client system 151, the details will not be repeated.

Figure 2:
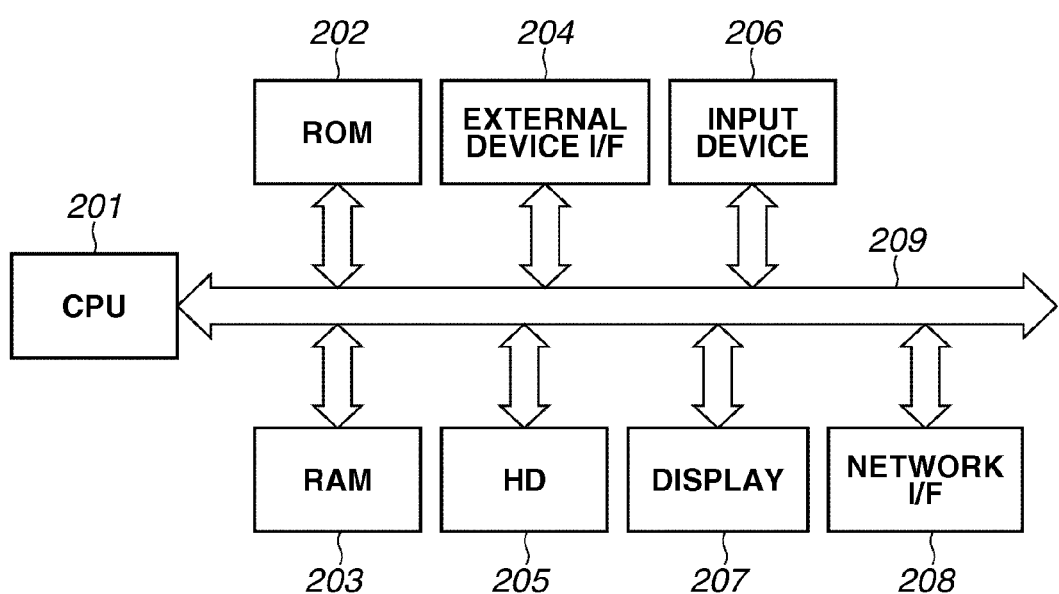
FIG. 2 is a block diagram illustrating an example of a configuration of a remote monitoring apparatus, a central management apparatus, a distribution server, a host personal computer (PC), and a PC.

FIG. 2 is a block diagram illustrating an example of a configuration of the remote monitoring apparatuses 101 and 105, the central management apparatus 111, the distribution server 121, the host PCs 133 and 138, and the PC 137, each of which is an information processing apparatus according to the present exemplary embodiment. FIG. 2 can correspond to a configuration of the information processing apparatus disposed at a back end (not illustrated).

As illustrated in FIG. 2, a central processing unit (CPU) 201 is a control unit of the information processing apparatus, and executes an application program, a printer driver program, an operating system, and a device management program according to the present exemplary embodiment, which are stored in a hard disk (HD) 205. Further, one CPU is provided according to the present exemplary embodiment, but, a plurality of CPUs may be also provided.

A read-only memory (ROM) 202 is a non-rewritable storage unit, and stores therein a basic input/output (I/O) program, a program for performing each processing of the present apparatus, and the data. A random access memory (RAM) 203 temporarily stores information and files required for executing the program, and functions as a main memory and a work area of the CPU 201.

The processing of each step of the remote monitoring apparatuses 101 and 105 in each flowchart described below can be realized when the CPU 201 performs processing based on a program code computer-readably recorded in the storage unit such as an external storage device connected to the ROM 202, the HD 205, and an external device interface (I/F) 204 described below.

The external device I/F 204 connects the external storage devices with the present apparatus. The external storage device is connected to the external device I/F 204 to load a program stored in a recording medium into the present information processing apparatus. The recording medium arbitrarily includes a floppy disk (FD), a compact disc (CD)-ROM, a CD-recordable (R), a CD-rewritable (RW), a PC card, a digital versatile disc (DVD), an integrated circuit (IC) memory card, a magneto optical disk (MO), and a memory stick.

The HD 205 stores various types of data including a program and data of each processing performed by the present apparatus, temporary data, information about the image forming apparatus to be monitored according to the present exemplary embodiment, and the data collected from the image forming apparatus. Further, as illustrated in FIG. 2, one HD is provided, but, a plurality of HDs may be provided. Furthermore, in place of the HD, other storage devices such as a solid state drive (SDD) may be provided.

An input device 206 is an instruction input unit and includes a keyboard and a pointing device. Using the input device 206, a user of this system including a service engineer, an operator, and a manager can input an instruction for setting and operation into the information processing apparatus.

A display 207 is a display unit for displaying an instruction input via the input device 206, and the state and setting of the image forming apparatus to be managed. Actually, a drawing command issued by the application via a mechanism of the OS is interpreted by a graphic card, and information converted into an analog signal or a digital signal may be displayed on the display unit. Display control according to the present exemplary embodiment includes processing for generating the drawing command via the OS to display the drawing command on the display unit.

A network I/F 208 is connected to the LAN and the Internet via the network to exchange the information with the outside. The information processing apparatus exchanges the data with an external device via the network IF 208.

A system bus 209 controls a flow of the data of components 201 to 208 in the information processing apparatus.

Figure 3:
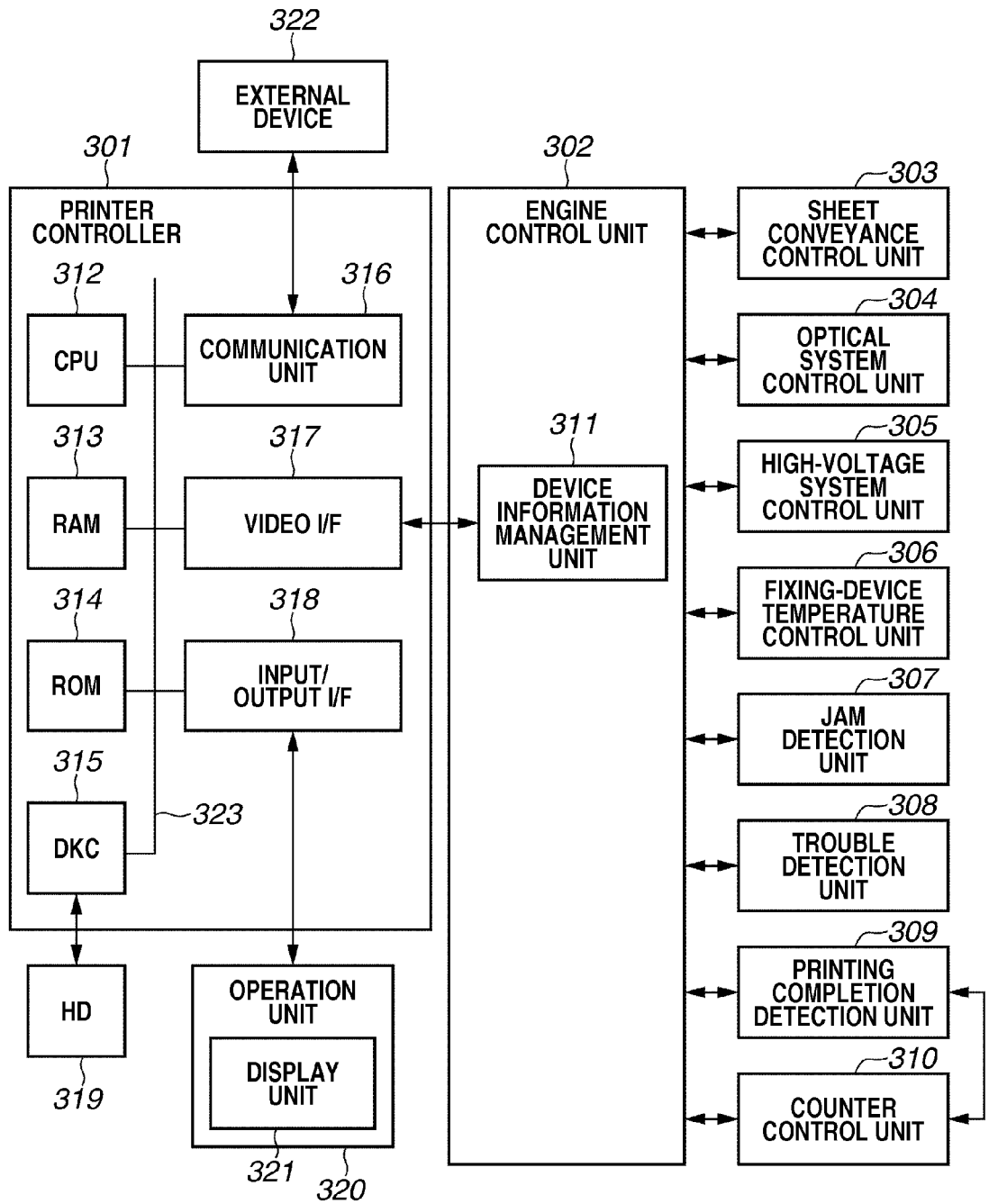
FIG. 3 is a block diagram illustrating an example of a configuration of a printer control unit of an image forming apparatus and a peripheral part thereof.

FIG. 3 is a block diagram illustrating an example of a configuration of a printer control unit of the image forming apparatuses 104a, 104b, 104c and 108a, 108b, and 108c and a peripheral parts thereof according to the present exemplary embodiment.

FIG. 3 illustrates a printer controller 301. The printer controller 301 includes a communication unit 316 for performing transmission/reception of various types of data with an external device 322 (remote monitoring apparatuses 101 and 105, central management apparatus 111, and distribution server 121 illustrated in FIG. 1) such as a host computer via a predetermined protocol. Further, the printer controller 301 includes a video I/F 317 for performing exchange of the signals and serial communication with an engine control unit 302 described below, in addition to performing the communication, the reception of image data, development of the received image data into information that can be printed by a printer.

Based on a control program stored in a ROM 314 or an HD (external memory) 319, the CPU 312 of the image forming apparatus comprehensively controls access to various types of devices connected to the system bus 323. Further, the CPU 312 outputs an image signal as output information to a printer engine connected via the video I/F 317. A RAM 313 functions as the main memory and the work area of the CPU 312.

A memory controller (DKC) 315 controls access to the external storage medium 319 such as a hard disk (HD) storing a boot program, variety of applications, font data, a user file, and a setting file.

An operation unit 320 includes a display unit 321 and an input unit such as a keyboard (not illustrated), and provides an operator with information via an input/output I/F 318 and allows the operator to input an instruction.

The engine control unit 302 exchanges signals with the printer controller 301 and controls various units 303 to 310 of the printer engine via serial communication.

A sheet conveyance control unit 303 conveys a sheet to be printed to perform sheet conveyance up to sheet discharge after printing has been finished based on an instruction of the engine control unit 302. An optical system control unit 304 drives a scanner motor and controls laser to turn on/off based on an instruction of the engine control unit 302.

A high-voltage system control unit 305 performs high-voltage output required for an electrophotographic process including charge, development, and transfer based on the instruction of the engine control unit 302. A fixing-device temperature control unit 306 controls the temperature of a fixing device and detects a trouble thereof based on the instruction of the engine control unit 302.

A jam detection unit 307 detects a conveyance trouble during the sheet conveyance. A trouble detection unit 308 detects a trouble of a function unit in the printer. A printing completion detection unit 309 detects that printing has been normally performed and notifies the engine control unit 302 of the completion of the normal printing. A counter control unit 310 updates the various types of counter information after the printing has been completed.

The engine control unit 302 includes a device information management unit 311. The device information management unit 311 manages information about each unit of the printer engine. In response to a request from the external device 322, the device information management unit 311 acquires a counter value from the counter control unit 310 and transmits it to the video I/F 317, for example. With this arrangement, the counter information is transmitted to the external device 322 via the video I/F 317 and the communication unit 316. Additionally, when the external device 322 requests acquisition of the information, the device information management unit 311 appropriately acquires the information from each unit.

Further, the device information management unit 311 also manages jam information notified by the jam detection unit 307 and error information notified by the trouble detection unit 308. When an event notification is previously requested by the external device 322, such information is transmitted to the external device 322 via the video I/F 317.

Further, the image forming apparatus according to the present exemplary embodiment can be also applied to a laser beam printer using the above-described electrophotographic method, an ink-jet printer using an ink-jet method, or a thermal head printer adopting a thermal transfer method, or a copying machine.

With reference to FIGS. 4 to 7, a software configuration of each apparatus configuring the present device management system will be described below.

Figure 4:
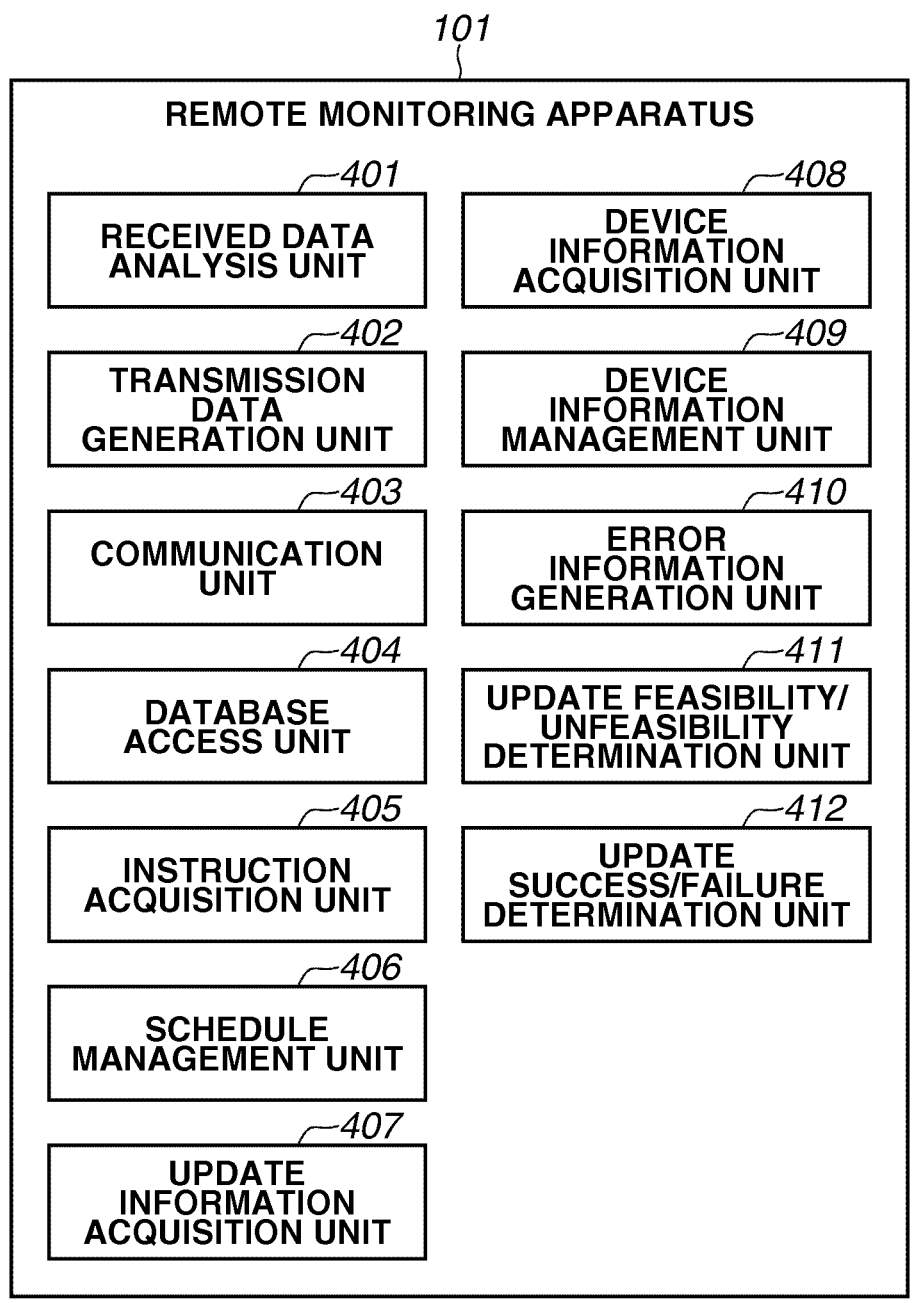
FIG. 4 is a block diagram illustrating an example of a software configuration in the remote monitoring apparatus.

FIG. 4 is a block diagram illustrating an example of the software configuration in the remote monitoring apparatuses 101 and 105.

FIG. 4 illustrates processing units 401, 402, 403, 404, 405, 406, 407, 408, 409, 410, 411, and 412 corresponding to each function realized when the CPU 201 provided in the remote monitoring apparatus 101 reads and executes the control program according to the present exemplary embodiment, which is computer-readably recorded in a storage unit such as the ROM 202 and the HD 205. Each processing unit will be described in detail below.

A received data analysis unit 401 analyzes received data that has been received from the central management apparatus 111, distribution server 121, and the image forming apparatuses 104 and 108 via the communication unit 403, and transmits the received data to an appropriate processing unit for each data.

A transmission data generation unit 402 generates transmission data corresponding to a communication protocol on request from each processing unit. The transmission data generated by the transmission data generation unit 402 is transmitted to the central management apparatus 111, the distribution server 121, and the image forming apparatuses 104, 108 via the communication unit 403.

The communication unit 403 transmits/receives the data to/from an external information processing apparatus such as the central management apparatus 111, the distribution server 121, and the image forming apparatuses 104 and 108 via the network including the LAN and the Internet.

A database access unit 404 performs input/output to/from the databases 103 and 107. According to the present exemplary embodiment, an instruction acquisition unit 405 acquires a firmware update instruction from the central management apparatus 111.

The schedule management unit 406 manages each processing schedule of the remote monitoring apparatus. The processing to be controlled by the schedule management unit 406 includes the processing required for being performed based on the instruction from the central management apparatus 111 or according to the present exemplary embodiment. According to the present exemplary embodiment, to perform such processing periodically or at a specified time, the schedule management unit 406 performs timer control.

An update information acquisition unit 407 acquires detailed update information including firmware updating date and time for the firmware for which the update instruction has been received. According to the present exemplary embodiment, the distribution server 121 manages the update information, and the update information acquisition unit 407 of the remote monitoring apparatuses 101 and 105 acquires the above-described update information from the distribution server 121. An acquisition source of the update information by the update information acquisition unit 407 of the remote monitoring apparatuses 101 and 105 is not limited to the distribution server 121, but may be the central management apparatus 111 for example.

A device information acquisition unit 408 acquires device information including the state of the image forming apparatus and firmware information therein. A device information management unit 409 manages the device information acquired by the device information acquisition unit 408 and the update information about the firmware for each image forming apparatus acquired by the update information acquisition unit 407. Further, the device information management unit 409 stores the various types of information in the databases 103, 107 via the database access unit 404.

An error information generation unit 410 generates the error information according to the present exemplary embodiment. The error information generated by the error information generation unit 410 is processed as the transmission data by the transmission data generation unit 402 and transmitted to the central management apparatus 111 and a set error notification destination via the communication unit 403.

An update feasibility/unfeasibility determination unit 411 determines whether the firmware update processing can be performed in the state of the image forming apparatuses 104 and 108 acquired by the device information acquisition unit 408. The update success/failure acquisition unit 412 acquires information about whether the firmware update has been successfully performed by the image forming apparatuses 104 and 108.

Figure 5:
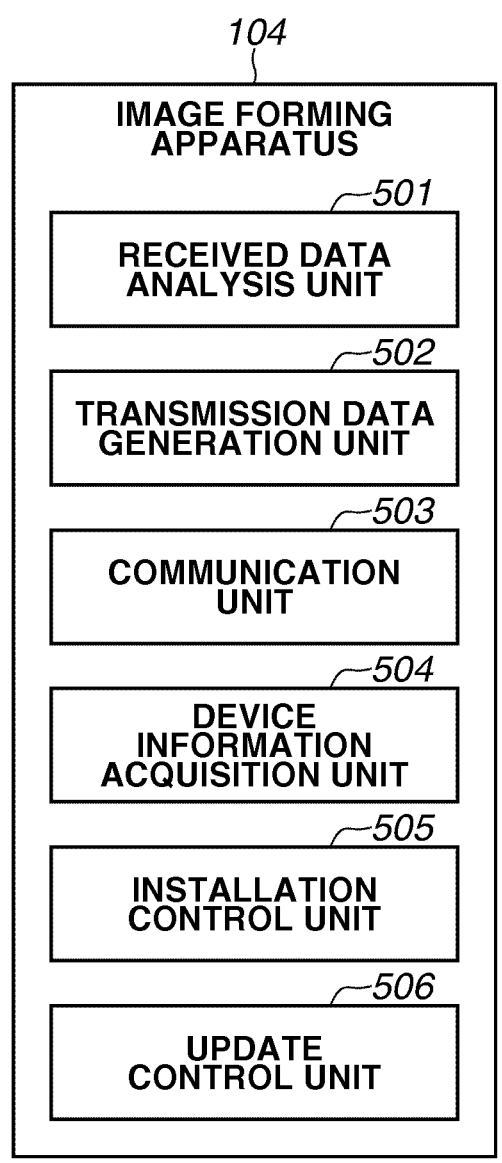
FIG. 5 is a block diagram illustrating an example of a software configuration in the image forming apparatus.

FIG. 5 is a block diagram illustrating a software configuration in the image forming apparatuses 104 and 108.

FIG. 5 illustrates processing units 501, 502, 503, 504, 505, and 506 corresponding to each function realized when the CPU 312 provided in the image forming apparatuses 104 and 108 reads and executes the control program according to the present exemplary embodiment, which is computer-readably recorded in a non-volatile storage unit such as the ROM 314 and the external storage medium 319. Each processing unit will be described in detail below.

A received data analysis unit 501 analyzes the received data that has been received from the central management apparatus 111, distribution server 121, and the image forming apparatuses 101 and 105 via the communication unit 503, and transmits the received data to the appropriate processing unit for each data.

A transmission data generation unit 502 generates the transmission data corresponding to the communication protocol on request from each processing unit. The transmission data generated by the transmission data generation unit 502 is transmitted to the central management apparatus 111, the distribution server 121, and the image forming apparatuses 104 and 108 via the communication unit 503.

The communication unit 503 transmits/receives the data to/from the external information processing apparatus such as the central management apparatus 111, the distribution server 121, and the image forming apparatuses 101 and 105 via the network including the LAN and the Internet.

A device information acquisition unit 504 acquires state information including a service call, jam, and out of tonner that have occurred in the image forming apparatus. Further, the device information acquisition unit 504 acquires the firmware information and the counter information retained inside the image forming apparatus based on the instruction from the remote monitoring apparatuses 101 and 105. The data acquired by the device information acquisition unit 504 is processed into the transmission data by the transmission data generation unit 502, and transmitted by the communication unit 503 to an acquisition request source such as the remote monitoring apparatuses 101 and 105.

An installation control unit 505 performs installation processing for actually applying the firmware downloaded from the distribution server 121 to the image forming apparatus.

Upon receiving the update instruction, an update control unit 506 acquires and downloads information required for installation and the target firmware from the distribution server 121 and stores them in a storage device such as the HD 319 of the image forming apparatus. The information acquired from the distribution server 121 and required for the installation includes at least a version and the updating date and time of the firmware.

Further, the update control unit 506 downloads the firmware from the distribution server 121 by the specified updating date and time and then, according to the specified updating date and time, performs the update processing using the installation control unit 505. According to the present exemplary embodiment, the remote monitoring apparatuses 101 and 105 request the update instruction from the image forming apparatus, to perform the update processing of the firmware.

Figure 6:
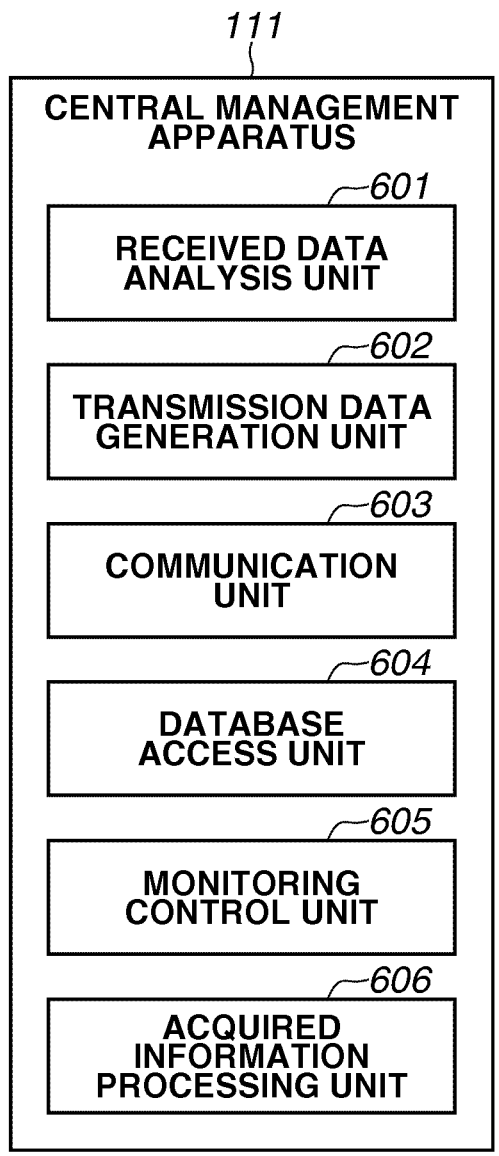
FIG. 6 is a block diagram illustrating a software configuration in the central management apparatus.

FIG. 6 is a block diagram illustrating an example of a software configuration in the central management apparatus 111.

FIG. 6 illustrates processing units 601, 602, 603, 604, 605, and 606 corresponding to each function realized when the CPU 201 provided in the central management apparatus 111 reads and executes the control program according to the present exemplary embodiment, which is computer-readably recorded in the non-volatile storage unit such as the ROM 202 and the HD 205. Each processing unit will be described in detail below.

A received data analysis unit 601 analyzes the received data that has been received from the remote monitoring apparatuses 101 and 105, the distribution server 121, and the image forming apparatuses 104 and 108 via the communication unit 603, and transmits the received data to the appropriate processing unit for each data.

A transmission data generation unit 602 generates the transmission data corresponding to the communication protocol on request from each processing unit. The transmission data generated by the transmission data generation unit 602 is transmitted to the remote monitoring apparatuses 101 and 105, the distribution server 121, and the image forming apparatuses 104 and 108 via the communication unit 603.

The communication unit 603 transmits/receives the data to/from the external information processing apparatus such as the remote monitoring apparatuses 101 and 105, the distribution server 121, and the image forming apparatuses 104 and 108 via the network including the LAN and the Internet. In other words, the communication unit 603 receives notification (notification reception) from the remote monitoring apparatuses 101 and 105.

A database access unit 604 performs input/output to/from the database 112.

A monitoring control unit 605 manages schedule for acquiring monitor information and charge information from all remote monitoring apparatuses and controls monitoring content and a monitoring method. Further, as necessary, the monitoring control unit 605 transmits the instruction to the remote monitoring apparatuses 101, 105 under the management of the monitoring control unit 605 via the transmission data generation unit 602 and the communication unit 603. Similarly, the update instruction of the firmware for each image forming apparatus to be managed is also transmitted by the monitoring control unit 605.

An acquired information processing unit 606 stores the information, which is received from the remote monitoring apparatuses 101 and 105 under the management of the acquired information processing unit 606, as it is or after being processed, in the database 112 via the database access unit 604. Further, the acquired information processing unit 606 notifies the service engineer or the client side of tallied counter information, error information, and newest firmware information based on the information received from the remote monitoring apparatuses 101 and 105 and the data stored in the database 112.

Figure 7:
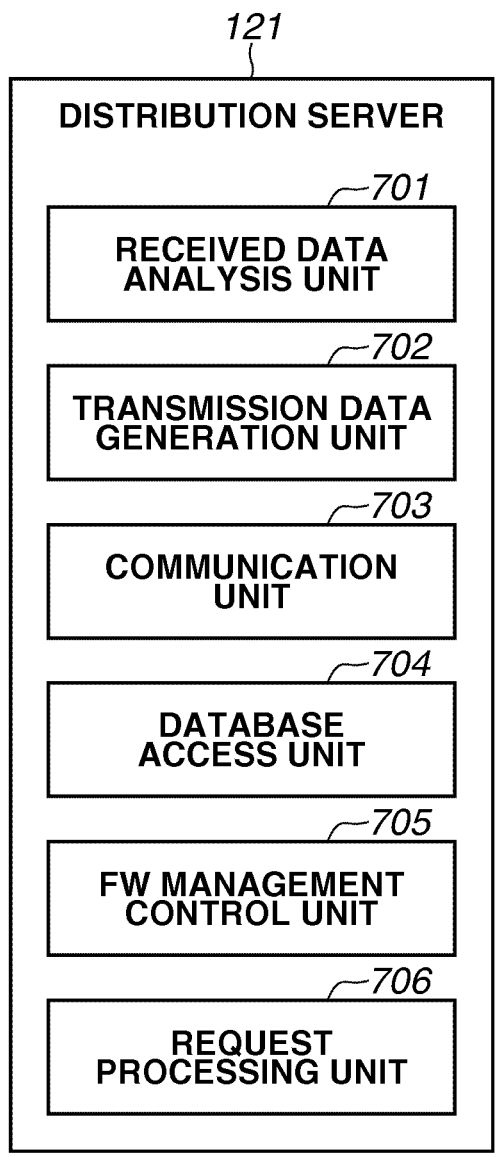
FIG. 7 is a block diagram illustrating a software configuration in the distribution server.

FIG. 7 is a block diagram illustrating an example of a software configuration in the distribution server 121.

FIG. 7 illustrates processing units 701, 702, 703, 704, 705, and 706 corresponding to each function realized when the CPU 201 provided in the distribution server 121 reads and executes the control program according to the present exemplary embodiment, which is computer-readably recorded in the non-volatile storage unit such as the ROM 202 and the HD 205. Each processing unit will be described in detail below.

The received data analysis unit 701 analyzes the received data that has been received from the remote monitoring apparatuses 101 and 105, central management apparatus 111, and the image forming apparatuses 104 and 108 via the communication unit 703, and transmits the received data to the appropriate processing unit for each data.

The transmission data generation unit 702 generates the transmission data corresponding to the communication protocol on request from each processing unit. The transmission data generated by the transmission data generation unit 702 is transmitted to the remote monitoring apparatuses 101 and 105, the central management apparatus 111, and the image forming apparatuses 104 and 108 via the communication unit 703.

The communication unit 703 transmits/receives the data to/from the external information processing apparatus such as the remote monitoring apparatuses 101 and 105, the distribution server 121, and the image forming apparatuses 104 and 108 via the network including the LAN and the Internet.

The database access unit 704 performs input/output to/from the database 122. The firmware (FW) management control unit 705 manages detailed information about the firmware, the information about the firmware, and the update instruction for each image forming apparatus to be managed.

The request processing unit 706 performs appropriate processing on the request transmitted from the remote monitoring apparatuses 101 and 105, the central management apparatus 111, and the image forming apparatuses 104 and 108.

Figure 8:
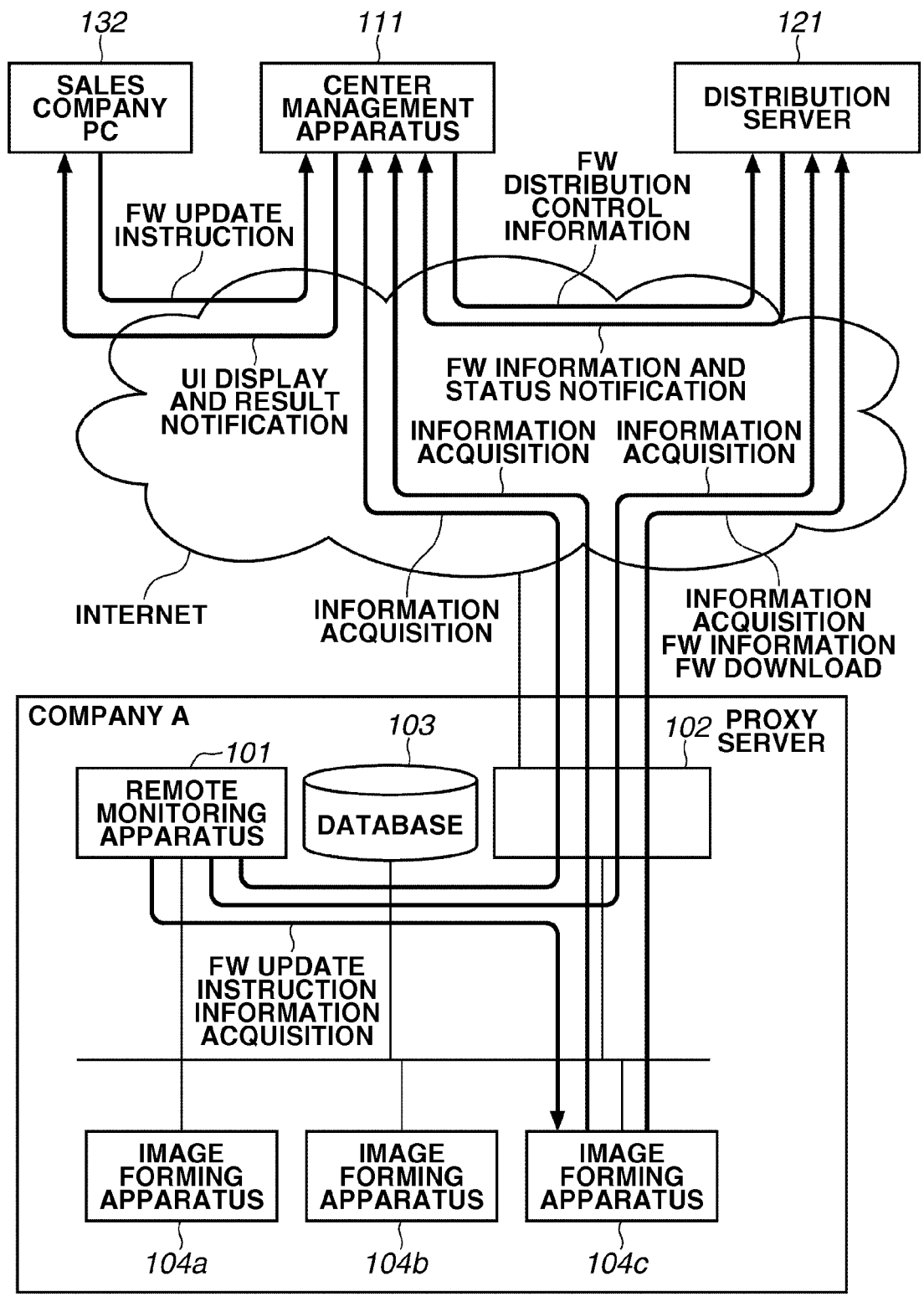
FIG. 8 illustrates a flow of entire processing in the device management system.

FIG. 8 illustrates a flow of entire processing in the device management system according to the present exemplary embodiment.

By the hardware configuration and the software configuration described above, the information can be communicated and the firmware can be distributed among the distribution server 121, the central management apparatus 111, and the image forming apparatuses 104a, 104b, and 104c. Details will be described below.

The firmware is distributed from the distribution server 121 to the image forming apparatus based on the instruction from the central management apparatus 111 according to the present exemplary embodiment or the instruction actually given by the service engineer or the manager via the image forming apparatus. Since the former embodiment is more effective according to the present exemplary embodiment, in the present exemplary embodiment, only the former embodiment will be described.

The firmware update processing is normally performed by the service engineer of the vendor, who is to update a version of the firmware of the client. The service engineer of the vendor accesses a web page provided by the above-described central management apparatus 111 as a user I/F via the PC 132 or the PC 137 in the vendor's company, and then specifies the image forming apparatus to be updated and the updating date and time of the firmware to instruct the update. This update instruction is given for each image forming apparatus. When this instruction is accepted, a result is returned from the central management apparatus 111 via the web page.

Upon receiving the firmware update instruction, the central management apparatus 111 transmits the firmware distribution control information (for each image forming apparatus) to the distribution server 121, and retains the firmware distribution control information in the distribution server 121. Further, the central management apparatus 111 retains a control instruction list to be distributed to the remote monitoring apparatuses 101 and 105, which manage the image forming apparatus to be managed, and retains the firmware update instruction (for each image forming apparatus) in the control instruction list.

The remote monitoring apparatuses 101 and 105 perform information acquisition processing on the central management apparatus 111 to periodically check whether the control instruction has been received. The central management apparatus 111 that has been checked as described above checks the control instruction list on the requested remote monitoring apparatus. When the control instruction has been received, the control instruction is returned to the remote monitoring apparatuses 101 and 105. When this instruction instructs the update of the firmware, the remote monitoring apparatuses 101 and 105 perform the processing described below with reference to FIGS. 9 to 14.

Upon receiving the firmware update instruction, the image forming apparatuses 104a, 104b, 104c, 108a, 108b, and 108c acquire the firmware information and other information required for the update from the distribution server, and the firmware is downloaded if the firmware update is required.

With reference to FIGS. 9 to 14, the processing in the remote monitoring apparatus 101 will be described. Similarly to the remote monitoring apparatus 105, to simplify the description, the remote monitoring apparatus 101 in the company A will be described.

FIGS. 9 to 14 are flowcharts illustrating examples of operations by the remote monitoring apparatus 101 according to the present exemplary embodiment. Processing of each step of the flowcharts in FIGS. 9 to 14 can be realized when the CPU 201 provided in the remote monitoring apparatus 101 reads and executes the control program according to the present exemplary embodiment, which is computer-readably recorded in the non-volatile storage unit such as the ROM 202 and the HD 205. The flowcharts in FIGS. 9 to 14 only illustrate the processing according to the present exemplary embodiment and, since other processing has different essential quality from that of the present exemplary embodiment, it will not be described. Further, in the description below, the image forming apparatus is denoted as a "monitored device" or simply a "device".

Figure 9:
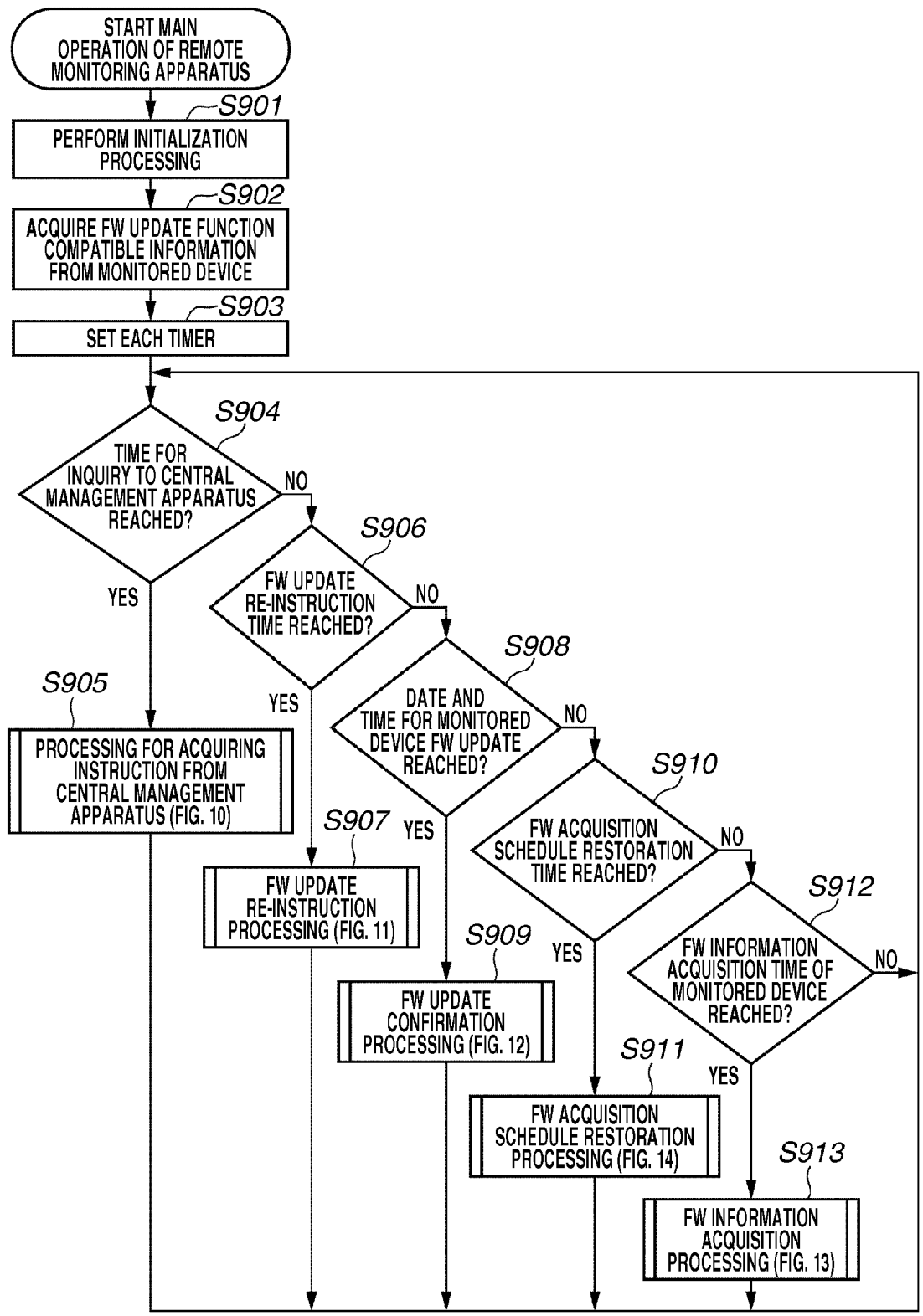
FIG. 9 is a flowchart illustrating an example of operations by the remote monitoring apparatus.

With reference to FIG. 9, a main operation by the remote monitoring apparatus 101 will be described.

FIG. 9 corresponds to the main operation by the remote monitoring apparatus 101.

In step S901, the CPU 201 of the remote monitoring apparatus 101 initializes the system when the power is turned on. More specifically, the CPU 201 of the remote monitoring apparatus 101 performs reading of an information table about all the image forming apparatuses that have been already registered as a monitor target as a device list, and then performs processing for initializing variables.

Subsequently, in step S902, the CPU 201 of the remote monitoring apparatus 101 acquires, from the monitored device in the device list read in step S901, information (FW update function compatible information) about whether the monitored device is compatible with the firmware update function. This acquisition processing is performed each time the program is initialized according to the present exemplary embodiment, but may be performed only when the monitored device is registered.

In step S903, the CPU 201 of the remote monitoring apparatus 101 sets a timer for periodical processing performed by this program. The timer for the periodical processing includes a timer for "inquiry time to the central management apparatus 111" and a timer for "firmware update re-instruction time" described below. For time specification processing, which is not periodical processing, the timer is set during the processing described below. According to the present exemplary embodiment, with the above-described time settings, the processing in steps S904, S906, S908, S910, and S912 described below is driven. The timer processing described above is managed by the schedule management unit 406.

In step S904, the schedule management unit 406 determines whether the inquiry time to the central management apparatus 111 has been reached.

In step S904, when it is determined that the inquiry time to the central management apparatus 111 has been reached (YES in step S904), then in step S905, the schedule management unit 406 controls the remote monitoring apparatus 101 to perform the instruction acquisition processing from the central management apparatus 111, described below with reference to FIG. 10. In step S905, when the instruction acquisition processing from the central management apparatus 111 is ended, the schedule management unit 406 returns the processing to step S904.

On the other hand, when it is not determined that the inquiry time to the central management apparatus 111 has been reached (NO in step S904), then in step S906, the schedule management unit 406 determines whether the firmware update re-instruction time has been reached.

In step S906, when it is determined that the firmware update re-instruction time has been reached (YES in step S906), then in step S907, the schedule management unit 406 controls the remote monitoring apparatus 101 to perform the firmware update re-instruction processing, described below with reference to FIG. 11. In step S907, when the firmware update re-instruction processing is ended, the schedule management unit 406 returns the processing to step S904.

On the other hand, in step S906, when it is not determined that the firmware update re-instruction time has been reached (NO in step S906), then in step S908, the schedule management unit 406 determines whether the firmware updating date and time of the monitored device has been reached.

In step S908, when it is determined that the firmware updating date and time of the monitored device has been reached (YES in step S908), then in step S909, the schedule management unit 406 controls the remote monitoring apparatus 101 to perform the firmware update confirmation processing, described below with reference to FIG. 12 to be performed. In step S909, when the firmware update confirmation processing is ended, the schedule management unit 406 returns the processing to step S904.

On the other hand, in step S908, when it is not determined that the firmware updating date and time of the monitored device has been reached (NO in step S908), then in step S910, the schedule management unit 406 determines whether the firmware acquisition schedule restoration time has been reached.

In step S910, when it is determined that the firmware acquisition schedule restoration time has been reached (YES in step S910), then in step S911, the schedule management unit 406 controls the remote monitoring apparatus 101 to perform firmware acquisition schedule restoration processing, described below with reference to FIG. 14 to be performed. In step S911, when the firmware acquisition schedule restoration processing is ended, the schedule management unit 406 returns the processing to step S904.

On the other hand, when it is not determined that the firmware acquisition schedule restoration time has been reached (NO in step S910), then in step S912, the schedule management unit 406 determines whether the firmware information acquisition time of the monitored device has been reached.

In step S912, when it is determined that the firmware acquisition schedule restoration time of the monitored device has been reached (YES in step S912), then in step S913, the schedule management unit 406 controls the remote monitoring apparatus 101 to perform the firmware information acquisition processing, described below with reference to FIG. 13 to be performed. In step S913, when the firmware information acquisition processing is ended, the schedule management unit 406 returns the processing to step S904.

On the other hand, when it is not determined that the firmware information acquisition time has been reached (NO in step S912), the schedule management unit 406 returns the processing to step S904.

Subsequently, with reference to FIG. 10, the instruction acquisition processing from the central management apparatus in step S905 illustrated in FIG. 9 will be described.

Figure 10:
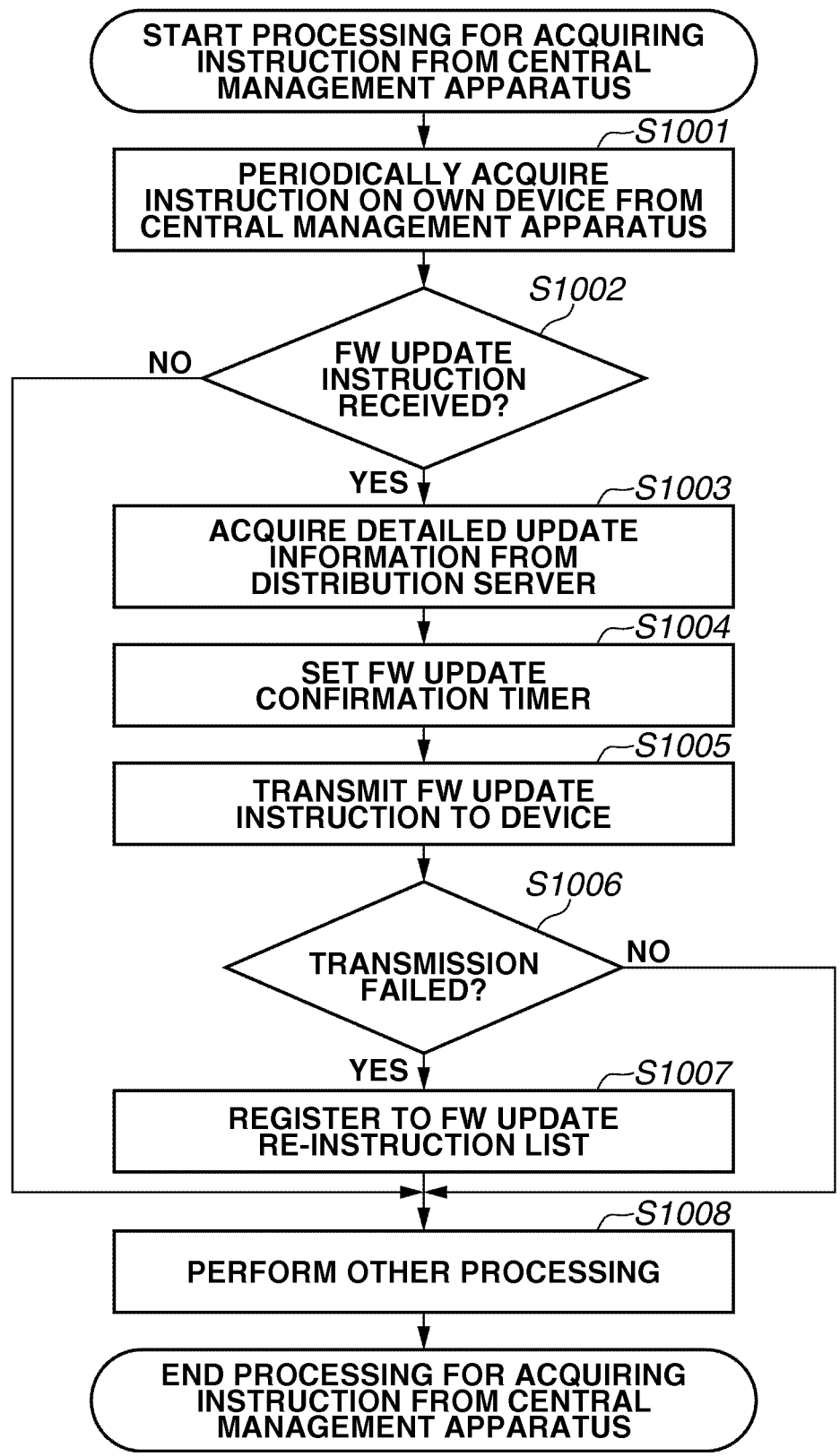
FIG. 10 is a flowchart illustrating an example of an instruction acquisition processing operation by the remote monitoring apparatus.

FIG. 10 corresponds to an operation of the instruction acquisition processing by the remote monitoring apparatus. This processing is periodically performed, and periodically driven by the timer set in step S903 illustrated in FIG. 9.

In step S1001, in the instruction acquisition processing, firstly, the instruction acquisition unit 405 makes an inquiry to the central management apparatus 111 and, in response to the inquiry, acquires an instruction to its own monitored device from the central management apparatus 111.

In step S1002, the received data analysis unit 401 determines whether the received data that has been received from the central management apparatus 111 in step S1001 includes a firmware update instruction.

In step S1002, when it is determined that the firmware update instruction is included (YES in step S1002), then in step S1003, the update information acquisition unit 407 acquires the detailed firmware update information (detailed update information) from the distribution server 121. The detailed update information includes at least the updating date and time, and information for specifying the image forming apparatus to be updated (serial number and device identification (ID)). In step S1003, a request ID for specifying a request from the vendor may be acquired.

In step S1004, the schedule management unit 406 sets a timer (timer for the above-described update target device) for performing update confirmation processing, described below with reference to FIG. 12, on the above-described update target device around the updating date and time included in the above-described update information. In other words, when a time of the timer is up, it is determined to be YES in step S908 illustrated in FIG. 9 (the firmware updating date and time of the monitored device has been reached). The date and time when the update confirmation processing is performed may be the same as the updating date and time included in the above-described detailed update information, or may be set before or after the updating date and time with some margin set.

In step S1005, the schedule management unit 406 transmits the firmware update instruction to the firmware update target device via the communication unit 403 (instruction transmission processing). The firmware update target device is determined based on the serial number of the update target device included in the above-described detailed update information.

In step S1006, the received data analysis unit 401 analyzes reply data received from the device to which the firmware update instruction has been transmitted in step S1005 via the communication unit 403, and then the schedule management unit 406 determines whether the transmission in step S1005 has failed. For example, when the above-described device has not replied to notify that the firmware update instruction has been received within a predetermined time, it is determined that the transmission has failed. In other words, when the device cannot reply due to the power-off state or the like, it is determined that the transmission has failed.

In step S1006, when it is determined that the transmission has failed in step S1005 (YES in step S1006), then in step S1007, the schedule management unit 406 registers the update failure device to the firmware update re-instruction list. The target device is registered to the firmware update re-instruction list so that the firmware update instruction can be re-transmitted to the target device as described with reference to FIG. 11. Further, the firmware update re-instruction list is stored in the RAM 203, the HD 205, or the database 103 in the remote monitoring apparatus 101.

When the registration processing in step S1007 is ended, the processing proceeds to step S1008.

On the other hand, in step S1006, when it is determined that the transmission in step S1005 has not failed (NO in step S1006), the processing proceeds to step S1008.

In step S1002, when it is determined that no firmware update instruction has been transmitted (NO in step S1002), the processing proceeds to step S1008.

In step S1008, the CPU 201 of the remote monitoring apparatus 101 appropriately performs the processing of the content instructed by the central management apparatus 111, and then the processing is ended. Since step S1008 has different essential quality from that of the present exemplary embodiment, it will not be described.

Figure 11:
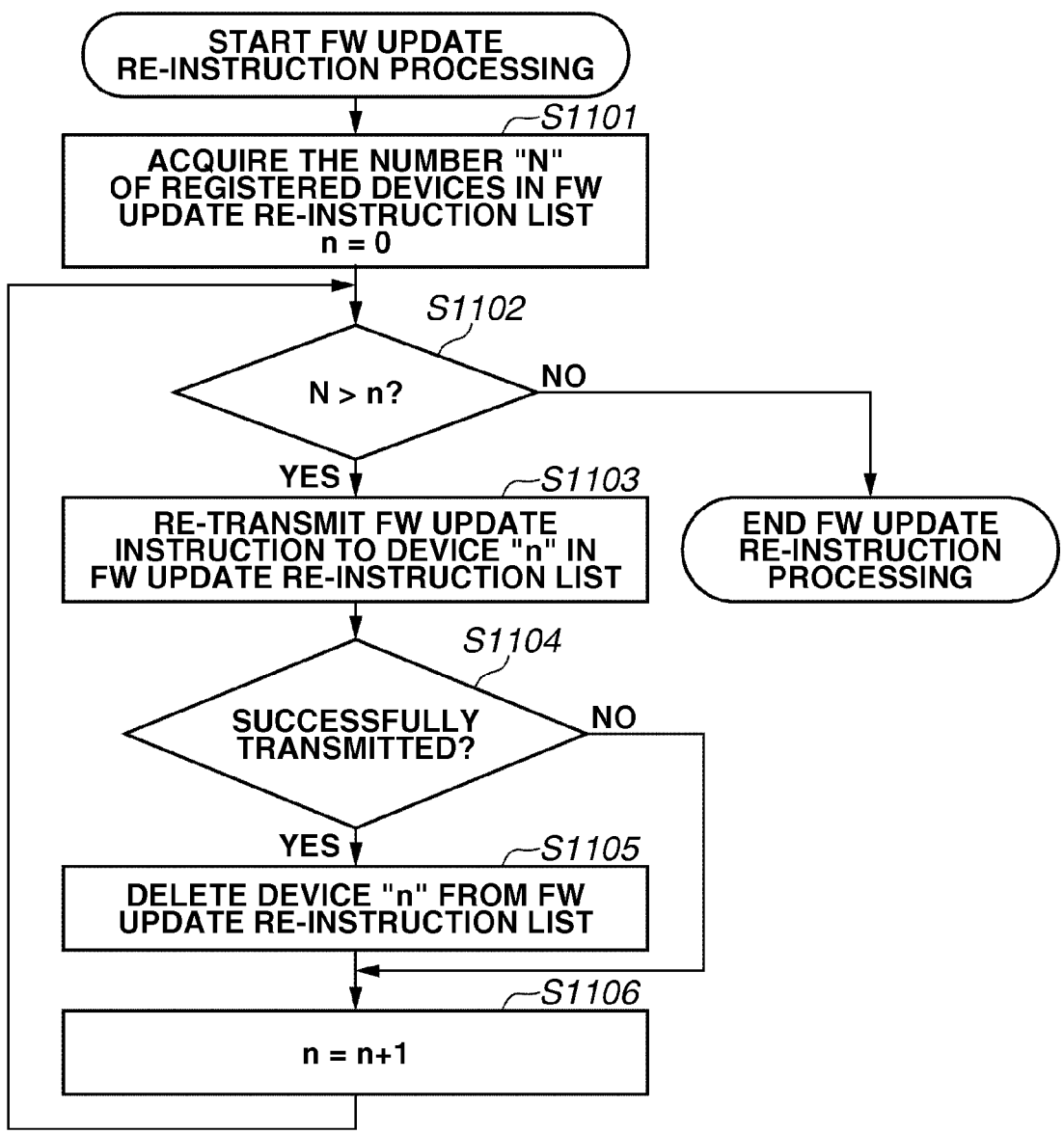
FIG. 11 is a flowchart illustrating an example of firmware update re-instruction processing operations by the remote monitoring apparatus.

With reference to FIG. 11, the firmware update re-instruction processing in step S907 illustrated in FIG. 9 will be described below.

FIG. 11 corresponds to operations of the firmware update re-instruction processing by the remote monitoring apparatus 101. This processing is periodically performed, and periodically driven by the timer set in step S903 illustrated in FIG. 9.

In step S1101, in the firmware update re-instruction processing, firstly, the schedule management unit 406 acquires the number "N" of registered devices in the firmware update re-instruction list and initializes a processing variable "n" to "0".

In step S1102, the schedule management unit 406 determines whether N>n is satisfied to perform the processing on all the registered devices.

In step S1102, when it is determined that N>n is satisfied (YES in step S1102), then in step S1103, the schedule management unit 406 re-transmits the firmware update instruction to a target device "n" in the firmware update re-instruction list via the communication unit 403.

In step S1104, the schedule management unit 406 causes the received data analysis unit 401 to analyze the reply data received by the device to which the firmware update instruction has been transmitted via the communication unit 403 in step S1103 to determine whether the transmission in step S1103 has been successfully performed.

When it is determined that the transmission in step S1103 has been successfully performed (YES in step S1104), then in step S1105, the schedule management unit 406 deletes the target device "n" from the firmware update re-instruction list, and the processing proceeds to step S1106.

On the other hand, when it is determined that the transmission performed in step S1103 has failed (NO in step S1104), since the firmware update instruction is required to be re-transmitted, the schedule management unit 406 does not delete the target device "n" from the list and the processing proceeds to step S1106.

In step S1106, to process a subsequent device in the list, the schedule management unit 406 increments the variable "n" and returns the processing to step S1102.

Further, in step S1102, when it is determined that N≤n is satisfied (NO in step S1102), the schedule management unit 406 ends the processing of this flowchart.

By periodically performing the firmware update re-instruction processing as described above, the possibility of successfully transmitting the firmware update instruction by the firmware updating specified date and time can be improved.

Figure 12:
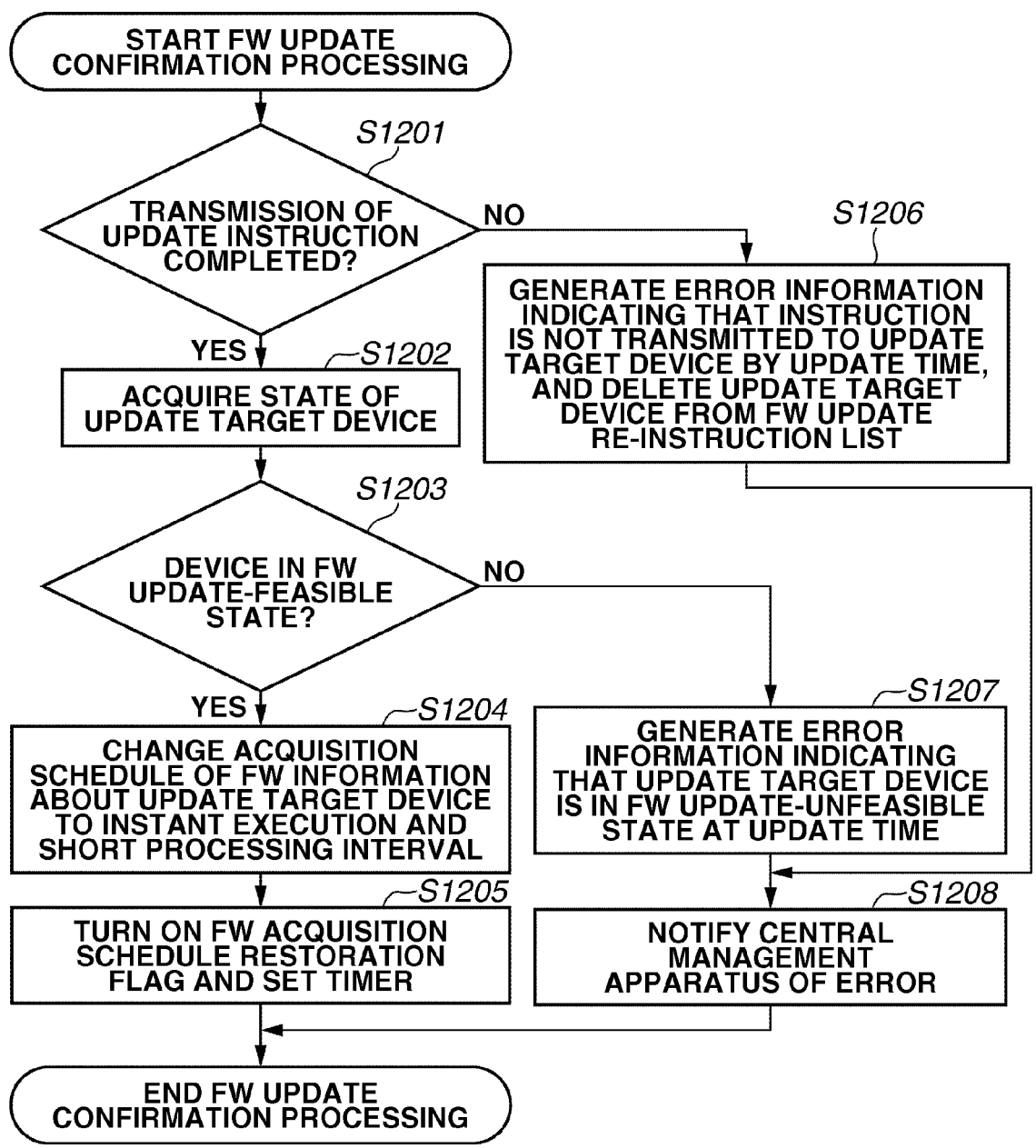
FIG. 12 is a flowchart illustrating an example of a firmware update confirmation processing operation by the remote monitoring apparatus.

With reference to FIG. 12, the firmware update confirmation processing in step S909 illustrated in FIG. 9 will be described below.

FIG. 12 corresponds to operations of the firmware update confirmation processing of the remote monitoring apparatus 101. This processing is driven by the timer (timer for an update target device) set in step S1004 illustrated in FIG. 10.

In step S1201, in the firmware update confirmation processing, firstly, the schedule management unit 406 determines whether the firmware update instruction has been transmitted to the above-described update target device. This determination can be performed by checking whether the update target device is registered to the above-described firmware update re-instruction list. When the update target device is registered to the above-described list, the transmission has not been completed, and when it is not registered, the transmission has been completed. Alternatively, each monitored device may be managed by a flag.

In step S1201, when it is determined that the firmware update instruction has been transmitted (transmission has been performed) to the update target device (YES in step S1201), then in step S1202, the schedule management unit 406 causes the device information acquisition unit 408 to acquire a state of the update target device, and the processing proceeds to step S1203.

In step S1203, the schedule management unit 406 causes the update feasibility/unfeasibility determination unit 411 to determine whether the firmware update can be performed. This determination is performed by, for example, retaining a status code capable of updating or a status code incapable thereof, and determines whether a state of the update target device acquired in step S1202 corresponds to the status code capable of updating or the status code incapable thereof.

In step S1203, when it is determined that the firmware update can be performed (YES in step S1203), then, in step S1204, the schedule management unit 406 instantly performs processing of the acquisition schedule of the firmware information about the update target device, further, processing interval is changed to be smaller, and the timer is set according to the changed schedule. The interval to be changed here may be adjustable, for example, once every ten minutes, based on a time generally required for updating the firmware. Further, an original schedule (e.g., once a week) is stored in the database 103 to be restored later. According to the acquisition schedule of the firmware information about the above-described update target device, the firmware information acquisition processing described below with reference to FIG. 13 is performed on the update target device.

Further, when the processing in step S1204 is ended, then in step S1205, the schedule management unit 406 requests the device information management unit 409 to turn on a firmware acquisition schedule restoration flag of the update target device. Furthermore, the schedule management unit 406 sets the timer for triggering the firmware acquisition schedule restoration processing, described below with reference to FIG. 14 (when a predetermined time has elapsed after updated date and time), and then the processing of this flowchart is ended.

Further, in step S1201, when it is determined that the firmware update instruction has not been completely transmitted (has not been transmitted) to the update target device (NO in step S1201), then in step S1206, the schedule management unit 406 causes the error information generation unit 410 to generate the error information indicating that the update instruction to the update target device has failed and the instruction to the update target device has not been able to be transmitted by the specified updating date and time and to delete the update target device from the firmware update re-instruction list. Subsequently, the processing proceeds to step S1208.

In step S1203, when it is determined that the firmware update cannot be performed (NO in step S1203), then in step S1207, the schedule management unit 406 causes the error information generation unit 410 to generate the error information indicating that the firm ware update has not been performed on the update target device at the firmware update time. Subsequently, the processing proceeds to step S1208. The above-described error information includes information at least about an update target device ID, a remote monitoring apparatus ID, an error code, and updating date and time. In step S1207, state information about the update target device is also included. Further, as described above, if a request ID for specifying the request form the vendor can be acquired, it may be added to the error information.

In step S1208, the schedule management unit 406 transmits the transmission data generated from the error information generated in steps S1206 and S1207 to the central management apparatus 111 via the communication unit 403, and the processing of this flowchart is ended.

As described above, when the firmware update instruction cannot be transmitted to the device by the firmware updating specified date and time, the error information indicating that the firmware update instruction cannot be transmitted to the device by the firmware updating specified date and time can be transmitted to the central management apparatus 111. Further, when the firmware update cannot be performed on the update target device at the firmware updating specified date and time, the error information indicating that the firmware update instruction cannot be transmitted to the device by the firmware updating specified date and times can be also transmitted to the central management apparatus 111.

Subsequently, with reference to FIG. 13, the firmware information acquisition processing in step S913 illustrated in FIG. 9 will be described.

Figure 13:
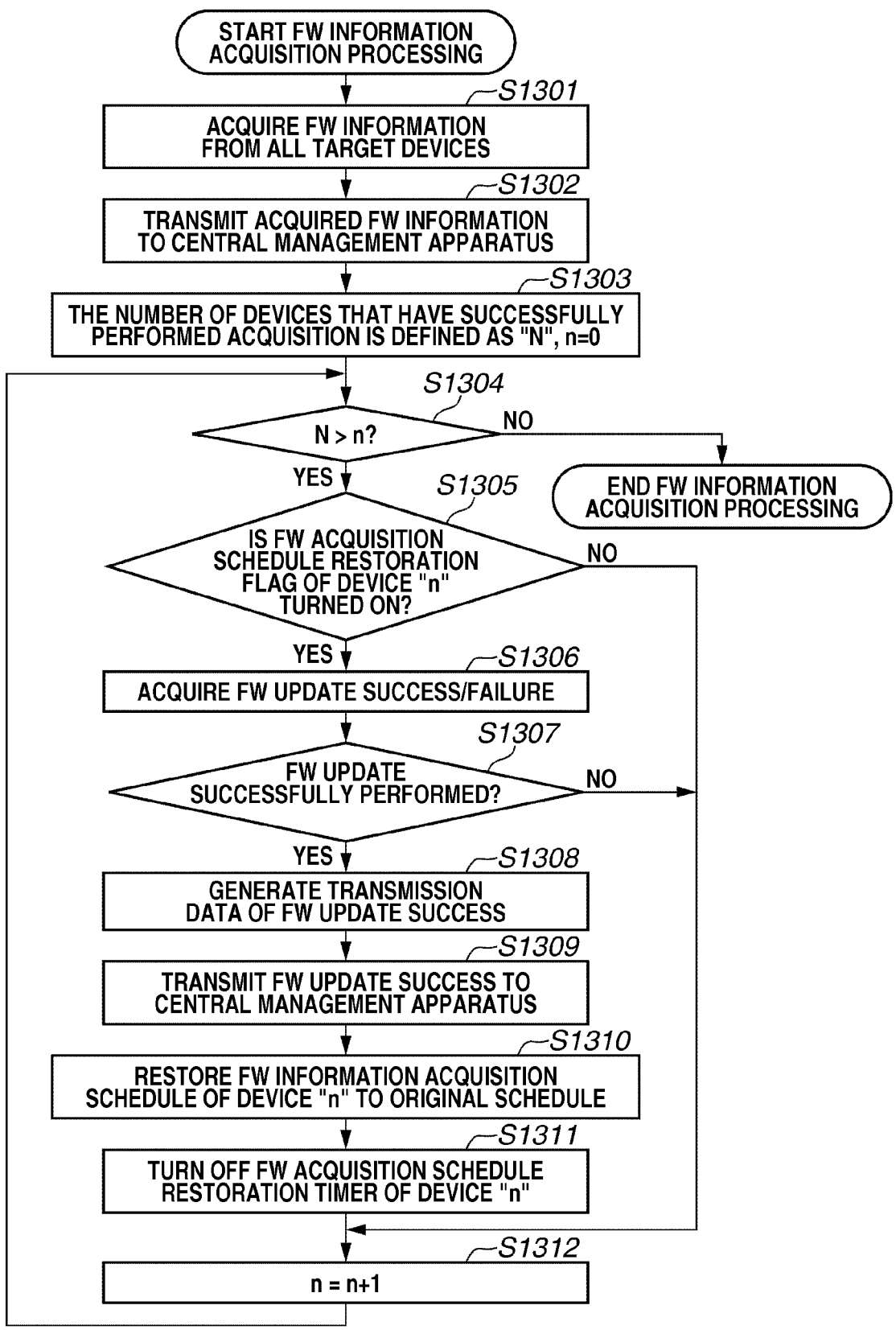
FIG. 13 is a flowchart illustrating an example of a firmware information acquisition processing operation by the remote monitoring apparatus.

FIG. 13 corresponds to operations of the firmware information acquisition processing of the remote monitoring apparatus 101. This processing is driven according to the acquisition schedule of the firmware information about the update target device changed in step S1204 illustrated in FIG. 12. In this case, the target device of this processing is the above-described update target device. In the remote monitoring apparatus, the firmware information acquisition schedule can be set for all the management target devices of the remote monitoring apparatus as the target. When this processing is activated according to this schedule, all the devices of the remote monitoring apparatus become the target devices of this processing.

In step S1301, in the firmware information acquisition processing, the schedule management unit 406 requests the device information acquisition unit 408 to acquire the firmware information from all the acquisition target devices (e.g., update target device). The received data analysis unit 401 analyzes the data returned from the target device via the communication unit 403, and requests the device information management unit 409 to store the acquired firmware information in the database 103.

In step S1302, the schedule management unit 406 transmits the above-described acquired firmware information to the central management apparatus 111 via the communication unit 403. The firmware information acquired in step S1301 is transmitted to the central management apparatus 111, but, only when the firmware information acquired in step S1301 is changed, the acquired firmware information may be transmitted to the central management apparatus 111.

In step S1303, the schedule management unit 406 defines the number of the devices from which the firmware information has been successfully acquired in step S1301 to "N", and initializes the processing variable "n" to "0". The "N" can be, for example, when being stored in the above-described in the database, a transmission completion flag set as False at the same time, and the number of devices having the transmission completion flag of False is counted to be calculated and specified.

Subsequently, in step S1304, the schedule management unit 406 determines whether N>n is satisfied.

In step S1304, when it is determined that N>n is satisfied (YES in step S1304), then in step S1305, the schedule management unit 406 causes the device information management unit 409 to determine whether the firmware acquisition schedule restoration flag of the processing target device "n" is turned on.

In step S1305, when it is determined that the firmware acquisition schedule restoration flag of the processing target device "n" is turned on (YES in step S1305), the schedule management unit 406 determines that the firmware update can be performed on the processing target device "n", and the processing proceeds to step S1306.

In step S1306, the schedule management unit 406 causes the update success/failure acquisition unit 412 to acquire information about whether the firmware update has been successfully performed from the processing target device "n". For example, when an image forming apparatus side can return success or failure of the firmware update, it can be acquired from the image forming apparatus.

In step S1307, the schedule management unit 406 determines, based on the information about the success or failure of the firmware update acquired in step S1306, whether the firmware update has been successfully performed on the processing target device "n".

In step S1307, when it is determined that the firmware update has been successfully performed (YES in step S1307), then in step S1308, the schedule management unit 406 causes the transmission data generation unit 402 to generate the transmission data indicating that the firmware update has been successfully performed on the processing target device "n".

In step S1309, the schedule management unit 406 transmits the transmission data indicating that the update of the firmware, which has been generated in step S1308, has been successfully performed to the central management apparatus 111 via the communication unit 403.

In step S1310, the schedule management unit 406 returns the firmware information acquisition schedule of the target device "n" to the original schedule stored in step S1204 illustrated in FIG. 12.

In step S1311, the schedule management unit 406 turns off a restoration timer of the firmware acquisition schedule of the target device "n", and the processing proceeds to step S1312.

In step S1307, when it is determined that the firmware update has failed (NO in step S1307), the processing proceeds to step S1312.

In step S1305, when the firmware acquisition schedule restoration flag of the processing target device "n" is turned off (NO in step S1305), the processing proceeds to step S1312.

In step S1312, the schedule management unit 406 increments the variable "n", and returns the processing to step S1304.

In step S1304, when it is determined that N≤n is satisfied (NO in step S1304), the schedule management unit 406 ends the processing of this flowchart.

Subsequently, with reference to FIG. 14, the firmware acquisition schedule restoration processing in step S911 illustrated in FIG. 9 will be described. This processing is driven by the timer set in step S1205 illustrated in FIG. 12. When the firmware update has not been successfully performed, usually, this processing is processed. However, even when the firmware update is successfully performed at some processing timing of the firmware information acquisition processing illustrated in FIG. 13, the firmware acquisition schedule restoration processing may be performed.

Figure 14:
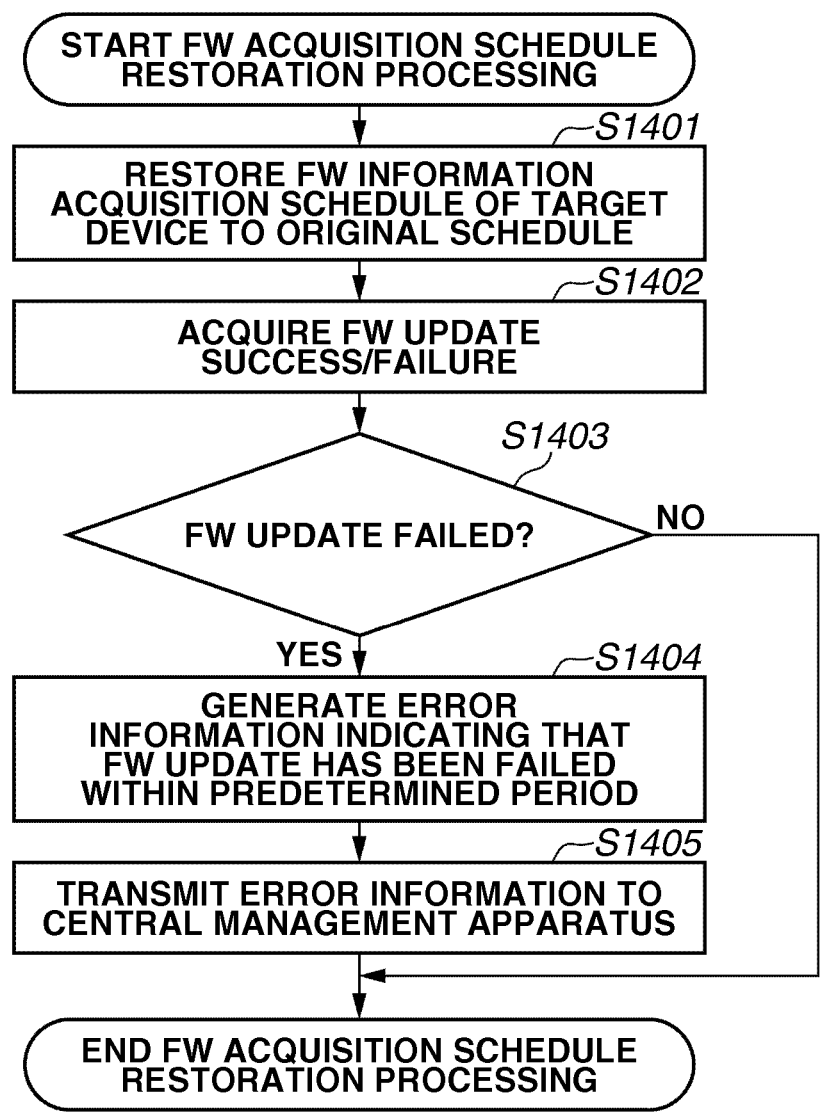
FIG. 14 is a flowchart illustrating an example of a firmware schedule restoration processing operation by the remote monitoring apparatus.

FIG. 14 corresponds to operations of the firmware schedule restoration processing.

In step S1401, in the firmware acquisition schedule restoration processing, firstly, the schedule management unit 406 restores the firmware information acquisition schedule of the update target device to the original schedule stored in step S1204 illustrated in FIG. 12.

In step S1402, the schedule management unit 406 causes the update success/failure acquisition unit 412 to acquire the information about whether the firmware update has been successfully performed.

Subsequently, in step S1403, the schedule management unit 406 determines whether the firmware update has failed.

In step S1403, when it is determined that the firmware update has failed (YES in step S1403), then in step S1404, the schedule management unit 406 causes the error information generation unit 410 to generate the error information indicating that the firmware update has not been successfully performed within a predetermined period. The error information includes, as described with reference to FIG. 12, the information at least about the update target device ID, the remote monitoring apparatus ID, the error code, and the updating date and time. Further, as described above, if the request ID for specifying the request from the vendor can be acquired, it may be added to the error information.

Subsequently, in step S1405, the schedule management unit 406 causes the communication unit 403 to transmit the error information generated in step S1404 to the central management apparatus 111, and the processing of this flowchart is ended.

On the other hand, in step S1403, when the firmware update has been successfully performed (NO in step S1403), the schedule management unit 406 ends the processing of this flowchart.

According to the present exemplary embodiment, the remote monitoring apparatus notifies the central management apparatus 111 of the firmware information installed in the image forming apparatus and the error information and, further, may notify another notification destination.

As described above, the remote monitoring apparatus, which is always in an activation state, performs error control using the firmware updating specified date and time as a key to notify the central management apparatus 111 or another specified notification destination of a cause of failure of the update processing. As a result, the failure of the firmware update can be quickly fixed and also the cause of the error can be addressed so that a success ratio when the firmware update is attempted again can be improved.

The update feasibility/unfeasibility determination unit 411 according to the first exemplary embodiment described above operates on the assumption that the image forming apparatus is capable of sending a reply indicating whether the firmware update has been successfully performed. However, the image forming apparatus may be incapable of sending the reply. In this case, detailed information about a name and a version of the firmware of the update target can be included into the detailed update information acquired in the detailed update information acquisition step in step S1003 illustrated in FIG. 10.

In this case, in the firmware update success/failure acquisition steps S1306 and S1402 illustrated in FIGS. 13 and 14, the schedule management unit 406 determines whether the firmware information acquired in the firmware information acquisition step in step S1301 is the one updated as the above-described detailed update information. With this arrangement, when the firmware information is updated into the specified version, it can be determined that the firmware update has been successfully performed. Thus, according to a second exemplary embodiment, the management system can be applied to the management of a greater number of image forming apparatuses.

According to the first exemplary embodiment, when the firmware update processing is ended up with the error, it is expected that only the error notification is transmitted to the central management apparatus 111, and re-processing is left to re-request by the user. However, a user's operation may delay the processing, and thus the user's operation may take a time.

Therefore, according to a third exemplary embodiment, the service engineer previously sets an updating date and time change pattern setting to be applied in case of the failure of the firmware update, and when the firmware update instruction and the firmware update processing have failed, the remote monitoring apparatus acquires the updating date and time change pattern setting. The remote monitoring apparatus transmits to the central management apparatus 111 a request (update instruction request) for setting the update instruction for the updating date and time based on the acquired updating date and time change pattern setting, via the same I/F (e.g., web service) as the request from the vendor. With this arrangement, the firmware update processing can be performed again.

The updating date and time change pattern setting may be performed on the distribution server 121 or the central management apparatus 111. Further, the re-instruction of the update instruction may be performed by the distribution server 121 or the central management apparatus 111.

As described above, according to the present exemplary embodiment, works of the user's operation can be reduced, and thus the firmware update can be performed in an earlier stage.

According to the first exemplary embodiment described above, by the firmware updating date and time as described with reference to FIG. 12, when the update instruction is not transmitted to the image forming apparatus to be updated, only the error is notified to the central management apparatus 111.

According to a fourth exemplary embodiment, a time for performing the confirmation processing is set a predetermined time earlier than the updating date and time. In step S1201, when it is determined that the update instruction has not been transmitted (NO in step S1201), the error notification is transmitted to the manager of the image forming apparatus, and further the processing proceeds to step S1202 a predetermined later so that the manager can restore (e.g., turns on the power) the image forming apparatus.

As described above, according to the fourth exemplary embodiment, the success ratio of the firmware update is increased.

According to each of the above described exemplary embodiments, one firmware update instruction is issued to one device. However, even when one firmware update instruction is issued to a plurality of devices, the exemplary embodiments can be applied. For example, even when one firmware update instruction is issued to each device group to which the same firmware can be applied, the exemplary embodiments can be applied.

As described above, according to each of the exemplary embodiments, when the remote monitoring apparatus, which is always in the activation state, performs the error control using the firmware updating specified date and time as the key to update the firmware of the image forming apparatus by remote control, even when the image forming apparatus itself is in the error state, for example, when the power is turned off, a cause of failure of the firmware update can be acquired to address the cause thereof. With this arrangement, the update failure can be quickly fixed and also the cause of the error can be addressed so that the success ratio when the update is attempted again can be improved.

The configuration and content of various types of data described above are not limited to those described above, but depending on usages and purposes, various types of configurations and contents can be included.

In the foregoing, exemplary embodiments have been described. can include a system, an apparatus, a method, a program, or a storage medium. Additional embodiments can be applied to a system including a plurality of devices and also an apparatus including a single device.

The above-described exemplary embodiments are not limiting, and various types of modifications (including an organic combination between exemplary embodiments) can be included. In other words, all configurations obtained by combining the above-described exemplary embodiments and their modification examples are applicable.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these embodiments are not limiting. The scope of the following claims is to be accorded the broadest interpretation so as to encompass all such modifications and equivalent structures and functions.

This application claims the benefit of Japanese Patent Application No. 2012-196247 filed Sep. 6, 2012, which is hereby incorporated by reference herein in its entirety.

What is claimed is:

1. A monitoring apparatus for monitoring a plurality of image forming apparatuses, the monitoring apparatus comprising:

a memory; and a processor in communication with the memory, the processor configured to control:

an inquiry unit configured to make an inquiry to a management apparatus;

a reception unit configured to receive, as a response to the inquiry, an update instruction for updating firmware of the image forming apparatus to be monitored;

a transmission unit configured to transmit to the image forming apparatus to be monitored an instruction for performing communication with a distribution server to download the firmware based on the update instruction;

a monitoring unit configured to monitor a state of the image forming apparatus corresponding to the update instruction; and a notification unit configured to notify the management apparatus of a result of monitoring performed by the monitoring unit, wherein the monitoring unit monitors whether the firmware has been updated in the image forming apparatus according to time information corresponding to the update instruction;

wherein, when the transmission unit fails in the transmission of the instruction, the notification unit notifies an error to the management apparatus.

2. The monitoring apparatus according to claim 1, wherein the transmission unit transmits, when the instruction has not been successfully transmitted, the instruction and, when the instruction has not been successfully transmitted by updating date and time as the time information, determines that the transmission of the instruction has failed.

3. The monitoring apparatus according to claim 1, wherein the monitoring unit monitors whether the image forming apparatus corresponding to the update instruction is in a state capable of updating the firmware at updating date and time as the time information, and, when the image forming apparatus is not in a state capable of updating the firmware as a result of monitoring, the notification unit is configured to notify the management apparatus of an error.

4. The monitoring apparatus according to claim 3, wherein the monitoring unit changes, when the image forming apparatus corresponding to the update instruction is in a state capable of updating the firmware at the updating date and time, an information acquisition schedule on the image forming apparatus for monitoring whether the firmware of the image forming apparatus has been updated.

5. The monitoring apparatus according to claim 4, wherein, when the firmware of the image forming apparatus corresponding to the update instruction has not been updated by a predetermined time later than the updating date and time, the notification unit notifies the management apparatus of an error.

6. The monitoring apparatus according to claim 1, wherein the monitoring unit monitors, at a predetermined time earlier than updating date and time as the time information, whether the image forming apparatus corresponding to the update instruction is in a state capable of updating the firmware, and, when the image forming apparatus is not in a state capable of updating the firmware as a result of monitoring, the notification unit is configured to transmit a notification to a predetermined notification destination.

7. The monitoring apparatus according to claim 1, wherein the processor is further configured to control:

an acquisition unit configured to acquire from the management apparatus an updating time information change pattern to be applied in case of a failure of the firmware update; and a request unit configured to, when it is determined that the update of the firmware has failed based on a result of monitoring, transmit a request for setting a firmware update instruction, of which updating time information has been changed according to the updating time information change pattern.

8. A management system including a monitoring apparatus for monitoring a plurality of image forming apparatuses, a management apparatus for managing information about the image forming apparatuses, and a distribution server for controlling distribution of firmware to the image forming apparatuses, the monitoring apparatus comprising:

a memory; and
a processor in communication with the memory, the processor configured to control: an inquiry unit configured to make an inquiry to the management apparatus;
a reception unit configured to receive, as a response to the inquiry, an update instruction for updating firmware of the image forming apparatus to be monitored;
an acquiring unit configured to acquire time information corresponding to the update instruction from a distribution system to download the firmware based on the update instruction;
a transmission unit configured to transmit to the image forming apparatus to be monitored an instruction for performing communication with the distribution system;
a monitoring unit configured to monitor whether the firmware has been updated in the image forming apparatus according to the time information corresponding to the update instruction; and
a notification unit configured to notify the management apparatus of a result of monitoring performed by the monitoring unit, and the management apparatus comprising:
a memory; and
a processor in communication with the memory, the processor configured to control: an instruction transmission unit configured to, when the update instruction for updating the firmware of the image forming apparatus is set, transmit the update instruction for updating the firmware of the image forming apparatus to the monitoring apparatus in response to the inquiry from the monitoring apparatus; and
a notification reception unit configured to receive a notification from the monitoring apparatus;
wherein, when the transmission unit fails in the transmission of the instruction, the notification unit notifies an error to the management apparatus.

9. A method for a monitoring apparatus for monitoring a plurality of image forming apparatuses, the method comprising:
making an inquiry to the management apparatus;
receiving, as a response to the inquiry, an update instruction for updating firmware of the image forming apparatus to be monitored;
transmitting to the image forming apparatus to be monitored an instruction for performing communication with a distribution server to download the firmware based on the update instruction;
monitoring a state of the image forming apparatus corresponding to the update instruction;
notifying the management apparatus of a result of the monitoring; and
monitoring whether the firmware has been updated in the image forming apparatus according to time information corresponding to the update instruction;
wherein, when the transmission unit fails in the transmission of the instruction, the notification unit notifies an error to the management apparatus.

10. A method performed by a management system including a monitoring apparatus for monitoring a plurality of image forming apparatuses, a management apparatus for managing information about the image forming apparatuses, and a distribution server for controlling distribution of firmware to the image forming apparatuses, the method comprising:
making, via the monitoring apparatus, an inquiry to the management apparatus;
receiving, via the monitoring apparatus, as a response to the inquiry, an update instruction for updating firmware of the image forming apparatus to be monitored;
acquiring time information corresponding to the update instruction from a distribution system to download the firmware based on the update instruction;
transmitting, via the monitoring apparatus, to the image forming apparatus to be monitored an instruction for performing communication with the distribution system;
monitoring, via the monitoring apparatus, as monitoring of a state of the image forming apparatus according to the time information corresponding to the update instruction, whether the firmware has been updated in the image forming apparatus corresponding to the update instruction;
notifying, via the monitoring apparatus, the management apparatus of a result of the monitoring;
transmitting, via the management apparatus, when the update instruction for updating the firmware of the image forming apparatus is set, the update instruction for updating the firmware of the image forming apparatus to the monitoring apparatus in response to the inquiry from the monitoring apparatus; and
receiving, via the management apparatus, a notification from the image forming apparatus;
wherein, when the transmission unit fails in the transmission of the instruction, the notification unit notifies an error to the management apparatus.

11. A computer-readable storage medium storing a computer program that causes a computer to execute a method for a monitoring apparatus monitoring a plurality of image forming apparatuses, the method comprising:
making an inquiry to the management apparatus;
receiving, as a response to the inquiry, an update instruction for updating firmware of the image forming apparatus to be monitored;
transmitting to the image forming apparatus to be monitored an instruction for performing communication with a distribution server to download the firmware based on the update instruction;
monitoring a state of the image forming apparatus corresponding to the update instruction;
notifying the management apparatus of a result of the monitoring; and
monitoring whether the firmware has been updated in the image forming apparatus according to time information corresponding to the update instruction;
wherein, when the transmission unit fails in the transmission of the instruction, the notification unit notifies an error to the management apparatus.

* * * * *